US011797093B2

(12) United States Patent
MacNaughton

(10) Patent No.: US 11,797,093 B2
(45) Date of Patent: Oct. 24, 2023

(54) INTEGRATING TACTILE NONVIRTUAL CONTROLS IN A VIRTUAL REALITY (VR) TRAINING SIMULATOR

(71) Applicant: Twisted Pair Productions Ltd., Regina (CA)

(72) Inventor: Mike MacNaughton, Regina (CA)

(73) Assignee: Twisted Pair Productions Ltd., Regina (CA)

( * ) Notice: Subject to any disclaimer, the term of this patent is extended or adjusted under 35 U.S.C. 154(b) by 98 days.

(21) Appl. No.: 17/571,920

(22) Filed: Jan. 10, 2022

(65) Prior Publication Data

US 2022/0276709 A1    Sep. 1, 2022

(30) Foreign Application Priority Data

Mar. 1, 2021   (CA) ..................... 3110869

(51) Int. Cl.
| | |
|---|---|
| *G06F 3/01* | (2006.01) |
| *G06T 17/00* | (2006.01) |
| *G09B 9/05* | (2006.01) |
| *G06F 3/04847* | (2022.01) |
| *G06T 7/70* | (2017.01) |
| *G06V 40/10* | (2022.01) |

(52) U.S. Cl.
CPC .......... *G06F 3/016* (2013.01); *G06F 3/04847* (2013.01); *G06T 7/70* (2017.01); *G06T 17/00* (2013.01); *G06V 40/10* (2022.01); *G09B 9/05* (2013.01)

(58) Field of Classification Search
CPC .......... G06F 3/016; G06T 7/70; G06T 17/00; G06V 40/10; G09B 9/00; G09B 9/05
See application file for complete search history.

(56) References Cited

U.S. PATENT DOCUMENTS

| 5,803,738 A * | 9/1998 | Latham ................ G09B 9/165 345/157 |
| 8,758,016 B1 * | 6/2014 | Henriksson ............ G09B 19/16 434/62 |
| 9,666,095 B2 * | 5/2017 | Swiderski ............. G09B 9/042 |
| 10,529,248 B2 * | 1/2020 | Chavez ................. G09B 9/302 |

* cited by examiner

*Primary Examiner* — Timothy A Musselman
(74) *Attorney, Agent, or Firm* — Gray Ice Higdon

(57) ABSTRACT

Tactile user participation and control feedback is introduced into a virtual reality training simulator environment. A computer for generating the simulator environment includes a control bus to which nonvirtual copies of virtual controls can be connected along with the camera showing the positioning of the trainee operator in relation to the control cab. Physical manipulation of the nonvirtual controls, along with the positioning of the limbs of the operator in relation thereto, is rendered inside the virtual environment. Tactical interaction with the physical controls maximizes mental reinforcement and training outcomes in the simulator.

33 Claims, 11 Drawing Sheets

INTEGRATING TACTILE NONVIRTUAL CONTROLS IN A VIRTUAL REALITY (VR) TRAINING SIMULATOR

FIELD OF THE INVENTION

This invention is in the field of virtual-reality training simulators used in commercial applications, and more specifically integrates tactile nonvirtual controls for use by the user in a way that will result in the rendering of the limbs and control activity of the user inside the virtual environment while at the same time permitting actual physical interaction with certain controls of the simulated vehicle.

BACKGROUND

Equipment simulators and simulated training environments are used in many scenarios to provide training ability for equipment operators. Many of the simulators which are used are purpose built and are extremely complicated and expensive to build, as well as to operate and maintain. For example, there are significant cost associated with training programs and training limitations in the aerospace industry as one example, where simulators are often purpose-manufactured to provide the ability to train pilots in the operation of particular aircraft including actual control cabs with multiple axes of movement and the like. Simulators are used in other transportation training areas as well—for example locomotive engineers and other equipment operators. However, many types of equipment have never been the subject of training simulator development, simply because of this complexity and cost. The need to be able to provide a physical control cab to enable realistic operator training and operations has by virtue of this complexity and cost heretofore limited the availability of such training, limiting the ability to provide the highest level of safety training and operations ability to various equipment operators in different applications.

One of the reasons for the complexity and cost in the manufacture of such equipment operation training simulators is the need to provide an actual interactive and tactile training experience for operators. For example in a flight training simulator, in addition to providing a flight requiring a significant amount of programming and three-dimensional terrain mapping and rendering technology, it is typically desired to provide the training pilot with an actual aircraft cockpit that is the same as the cockpit on the aircraft being trained, in which the controls are instrumented and connected to the remainder of the computer system operating the simulator whereby the pilot can actually operate the controls of the aircraft as if they are sitting in the actual cockpit of a real aircraft, and through interaction with the entirety of the control cockpit, the rendering of the view and behaviour of the remainder of the simulator can be generated and adjusted.

Some simulators as outlined even include a physical operations area for the user of the simulator which is capable of multiaxial adjustment during operation—for example in a flight simulator in addition to rendering a view out the window of the cockpit, actuation of the controls of the simulator and the rendered behaviour of the aircraft can also result in three-dimensional axial adjustment of the entire simulator cockpit. These types of complete and full some three-dimensional simulation experiences may still be the desired approach for many types of the most complex equipment simulation in the aerospace industry and the like, but if it were possible to provide a greater subset of the functionality of these types of simulators and a lower cost equipment embodiment, virtual reality training could be significantly enhanced and made widely available, to the benefit of equipment operators in many different industry sectors. Current state developments in the field of virtual reality technology are believed to allow for the simplification of certain of the applications of simulators such as this and to provide opportunities for expanded availability of simulated equipment operation training environments which provide some of the basic operator feedback and interaction that would be experienced in the use of a larger purpose-built environmental simulator such as a flight simulator.

One of the key aspects of a fully immersive simulator, which would be beneficial in the context of a simplified virtual reality environment is the need to still be able to provide tactile control engagement and feedback to the user. If it were possible to provide a somewhat simplified virtual reality training environment which incorporated an ability for a user to actuate and manipulate physical controls in the control cab area of the simulator which would translate into the rendering of the VR environment, this is believed to be commercially beneficial.

One of the other shortcomings of current virtual reality environments if you use them from a training perspective as well is the fact that there really is a mental disconnect between the virtual reality environment even if it shows the control cab in the virtual environment, and the limbs of the operator operating the simulator or the ultimate equipment i.e. it is believed that the best possible reinforcement and training behaviour is for the operator to experience manipulation of the controls in the virtual cab of the vehicle by their limbs. The arms and legs of the operator should be rendered and shown in the operating VR environment which has not been done in simulators to date. A virtual reality training simulator approach which incorporated the ability to not only feel controls in a physical operating cab of the simulator with your arms or legs etc. but to experience the movement of your limbs in conjunction with virtual copies of those controls inside the virtual environment is believed to be novel and to provide the maximum training value.

It is believed that if it were possible to offer a virtual reality equipment operation training experience that incorporated tactile physical controls for the vehicle being operated in the physical operating space of the VR operator/trainee, in conjunction with the rendering of the limbs of the trainee and/or other portions of their body, in conjunction with the virtual copies of the controls and the virtual control cab of the equipment inside of the VR environment this would be novel and would be widely accepted as an improvement over the current state of the art, resulting in the ability to proliferate virtual reality training for equipment operation and many types of heretofore untouched industries, at a more reasonable cost than fully immersive simulators used in many industries which will still have their place, and through the tactile interaction and mental connection of the limbs of the operator in the virtual environment maximum effectiveness and training value will be achieved.

SUMMARY OF THE INVENTION

As outlined above, this invention is in the field of the integration of nonvirtual controls and virtual reality training environment. This would be useful for the training of a trainee operator in the operation of particular types of equipment which has a physical control cab. The actual equipment being operated, and which is being trained using the simulator, would have a plurality of operator actuated controls in the physical control cab for use by the operator in operation thereof. The operator actuated controls are positioned in relation to an operator position, which in some cases might be an operator's seat, an operator standing position or the like. The concept of the present invention is to provide a plurality of tactile physical controls in relation to the operator position for the VR simulator, which are instrumented in a way that they can provide control inputs to the simulator for impact on the rendering in the VR environment as well as being demonstrated inside the environment in the view of the operator.

The method would be accomplished using a computer system which comprises a processor and a memory along with the human display interface which is connected to the computer for the display to a trainee operator of a three-dimensional VR operating environment of the equipment. In many cases now, the human display interface for such a VR simulator would be a set of virtual reality goggles, a helmet or other personally worn device, but in other cases it could also be flat or shaped monitors or other types of display devices which would also be understood to those skilled in the art and all are contemplated within the scope of the present invention.

The computer would also comprise a training simulator software component, programmed to render and display the VR operating environment to the trainee operator in accordance with the method. The training simulator software insofar as the actual three-dimensional or VR rendering is concerned will be understood to those skilled in the art, but the modification of the software to incorporate reliance upon physical controls it in the manipulation of the trainee operator, along with rendering visibility of the positioning and status of those physical controls inside the VR environment along with a view of the portions of the limbs of the training operator are key elements of the method and the invention.

The computer would also comprise a control bus for the capture of control inputs and video signal stream data by the computer for use in the rendering of the VR operating environment.

In addition to the computer responsible for rendering the VR environment for the view of the trainee operator via the human interface display, the computer would work in conjunction with the training control cab which comprises a plurality of nonvirtual controls corresponding to and emulating a plurality of the operator actuated controls of the physical control cab of the actual equipment being simulated and trained. The nonvirtual controls would be positioned in relation to a trainee position which corresponds approximately to the location of the operator position in the physical control cab of the actual equipment, and from which the trainee operator can interact with those nonvirtual controls. Effectively, it is contemplated that the training control cab would provide a tangible operational experience in conjunction with the rendered VR environment which would maximize the learning of the operator in training on the simulator. The training control cab would be configured similar to the actual physical control cab of the equipment being trained—for example if the physical control cab of the particular type of equipment being trained comprised a seat with the dashboard and driving controls or something of the like, the training control cab could be configured similarly. In other cases, the equipment being trained might have a standing operator position where the operator thereof could access necessary controls and the like and in such a circumstance if that were the type of equipment being trained on the simulator a similar training control cab would again be configured, allowing the training operator to position themselves in approximate similar positioning to where they would operate the actual equipment in a real circumstance. Configuration of the training control cab in terms of the position of equipment, inclusion of a seat or other types of comfort positioning devices, will all be understood to be very flexible depending upon the type of equipment being trained in the simulator and any type of a trading control cab which emulates the physical control cab of a piece of equipment otherwise programmed in accordance with the remainder of the present invention is contemplated within the scope hereof.

Each nonvirtual control in the training control Would be equipped with sensors to permit the capture of operating values there from when they were manually actuated by the trainee operator. Nonvirtual controls would be connected to the control bus of the computer, permitting the capture of operating values from the nonvirtual controls when they are actuated by the operator for use by the training simulator software component in the rendering of the training environment or the manipulation or operation of the virtual equipment being operated in the simulator.

Also connected to the computer control bus and located in relation to the training control cab is a video camera, positioned to capture a view of the trainee operator in the trainee position therein, along with capturing an image showing the positioning and orientation of the limbs of the trainee operator in relation to the nonvirtual controls. The video camera would generate a video signal data stream corresponding thereto which is captured by the control bus for use again by the training simulator software component. In operation of the method of the present invention this equipment and the training simulator software component would affect the method comprising the following steps.

On initiation of the method and throughout the time of training operation by the trainee operator, the training simulator software component would render and update the view of the VR operating environment to the human display device within which the trainee operator can simulate the operation of a virtual version of the equipment being trained. The view which would be rendered in the VR operating environment would include the placement, behaviour and operation of the virtual version of the equipment in relation to an operating area as well as a virtual control cab of the equipment including rendered versions of at least each operator-actuated control, being rendered cab controls, showing current status of the rendered cab controls based on the corresponding nonvirtual controls in the training control cab. The rendered versions of the controls which show the current status of the controls incorporating control behaviour actuated by the training operator from physical interaction with a manipulation of the physical controls in the training cab of the simulator. Finally, the view within the environment would also include the simulated view of the portions of the limbs of the trainee operator in relation to their position in the training control cab of the equipment and in interaction with each of the rendered cab controls, based upon the limb positioning of the trainee operator in relation to the nonvirtual controls in the training control cab. Ongoing rendering of the status of the controls in the cab of the equipment as well as the behaviour of the equipment within the remainder of the virtual environment would take place throughout the operating session of the method.

At any point in time during an operating session when the trainee operator manually actuates any of the nonvirtual controls in the training control cab, this actuation would be translated into a change in behaviour within the simulator environment. Operating values corresponding to the manual actuation of the nonvirtual controls would be captured on the computer via the control bus and would be converted into updated control parameters to be applied to the behaviour of the virtual version of the equipment within the VR operating environment. Following the calculation of any such modified control parameters, those updated control parameters would be applied to the rendering and behaviour of the virtual version of the equipment and the corresponding rendered controls within the virtual control cab as well as any modified or updated behaviour of the equipment based upon the control inputs received on the control bus.

In addition to showing rendered versions of the physical controls in the training control cab inside the virtual simulator environment, it is pointed out that on an ongoing basis during operation of the virtual version of the equipment by the trainee operator the environmental view which can be seen inside the VR environment includes a view of the portions of the limbs of the trainee operator in relation to the controls. Seeing and feeling your limbs operating the controls in the simulated environment will maximize imprinting of behaviour and training outcomes. During the operation of the virtual version of the equipment, the computer and the software component will apply an image recognition functions of the video signal data to yield the necessary limb rendering data corresponding to the positioning and orientation of the limbs of the trainee operator in relation to the nonvirtual controls within the training control cab, which will permit the rendering of virtual versions of the portions of the limbs of the trainee operator within the VR operating environment and the virtual control cab of the equipment. Upon any movement of the limbs of the trainee operator resulting in modified limb rendering data, the updated limb rendering data would be applied to the rendering and behaviour of the simulated version of the portions of the limbs of the trainee operator within the VR operating environment.

Providing a virtual reality training simulator which permits the visibility of a rendered version of the portions of the limbs of the trainee operator interacting with controls of the equipment in the virtual control Of the equipment inside the VR operating environment, while physically feeling the actuation of the nonvirtual controls within the training control cab of the simulator is a significant step forward in the training industry and will result in significant enhancements and safety outcomes in such training applications.

Within the overall scope of this brought method it will be understood that there can be further modifications refinements or enhancements made to the equipment, method and software which will all be contemplated within the scope here and will be understood within the general realm of the invention by those skilled in the art. For example in certain embodiments of the method of the present invention the rendering software component could adjust the appearance of the simulated view of the portions of the limbs of the trainee operator in relation to the rendered cab controls based upon the spacing of the trainee position in the training control cab from the nonvirtual controls. Specifically, the rendering of the portions of the limbs of the operator would be modified in such an embodiment to most closely correspond based upon the positioning of the trainee operator in relation to the controls—if the operator stood closer to the nonvirtual controls in the training control cab, versus further away, the rendering of the portions of the limbs would be adjusted inside the virtual environment.

In such a circumstance where the training simulator and the rendering software component was adjusting the appearance of the simulated view of the portions of the limbs of the trainee operator in relation to the positioning of the trainee position and the training control cab, the positioning of the trainee position within the training control cab could be physically adjustable. For example, if an operating seat was provided in the training control cab, the seat as any type of an operating seat for equipment could provide, could be physically adjustable in relation to the dashboard or the physical controls. If the positioning of the trainee position within the training control cab is physically adjustable in any way, the rendering software component could adapt to the rendered versions of the trainee operator in the rendered cab controls on the basis of the manually selected position setting which was selected by the trainee operator in advance of operation of the simulator, or in other embodiments, the training control could be instrumented such that the positioning of the trainee position in relation to the nonvirtual controls can be automatically captured as a control input on the control bus. In further embodiments of the method of the present invention, the rendering software component could determine the positioning of the trainee position based on the image recognition function being applied to the video data stream captured from the camera. Any such approach that results in the ability to capture the necessary information for the most accurate rendering of the portions of the limbs of the trainee operator in the virtual operating environment of the simulator will be understood by those skilled in the art to be within the intended scope of the present invention.

In certain embodiments of the present invention, the nonvirtual controls in the training control cab could include force feedback mechanisms, to provide additional tactile feedback to the trainee operator during operation of the simulator. The control bus could facilitate two-way communication with the instrumentation of the nonvirtual controls allowing actuation of the force feedback mechanisms of the controls dependent upon behaviours rendered by the software component inside of the virtual environment—for example if it was desired for a particular control to vibrate, pushback or otherwise provide additional user feedback similar to that which might be encountered by the actual operator of the equipment being simulated. Incorporation of force feedback of this nature will be understood to those skilled in the art of the capture of control inputs for virtual reality and other graphic rendering software etc. and again any type of a force feedback functionality which could be added to the overarching system of the present invention will be understood by those skilled in the art to be intended to be within the scope hereof.

It is specifically contemplated that the method of the present invention will be useful for simulating the operation of equipment having locomotion functions, and the nonvirtual controls in the training control cab could include locomotion controls to simulate the locomotion control of the equipment—for example a gas pedal, brake pedal, a clutch, or other types of controls which would be used by the operator of the actual equipment at which if properly instrumented could provide the necessary control inputs to the software component to allow for the most accurate rendering of the operation and behaviour of the simulated equipment inside the environment.

In addition to locomotion controls, the equipment being operated within the VR training environment could include non-locomotion functions and the nonvirtual controls in the training control cab could include process controls to simulate the operation of those non-locomotion equipment functions. The types of non-locomotion equipment functions which could be instrumented in this way to permit for their incorporation into the simulator is virtually endless and will be understood to be within the intended scope of the prior art.

The control bus used in conjunction with the remainder of the computer to capture and control the nonvirtual controls within the training control cab could either be an integrated hardware control bus with necessary software components on the computer itself or could also comprise an external hardware device removably connectable to the computer. In the case of an external hardware device it would permit for the retrofitting of the method of the present invention onto a pre-existing or non-purpose built computer platform. Both such approaches will be understood to be within the scope of the present invention.

In addition to the method of the present invention there is disclosed a training simulator software component for use on a computer in association with a system for integrating nonvirtual tactile controls in a virtual reality (VR) training simulator for training a trainee operator in the operation of equipment. As outlined above with respect to the method, the equipment being simulated within the method and VR environment has a physical control cab with a plurality of operator-actuated controls for use in operation thereof positioned in relation to an operator position. The training simulator software component of the present invention would be used on a computer for hosting and execution of the training simulator software component comprising a typical processor and memory configuration as well as a human display interface connected thereto for the display to a trainee operator of a three-dimensional VR operating environment within which the trainee operator can operate a virtual version of the equipment.

The computer would also include a control bus for the capture of control inputs and video signal stream data by the computer for use in the rendering of the VR operating environment, said data and control inputs readable by the training simulator software component for use in the adjustment and rendering of the VR environment throughout the operation of the method. The control bus would be connected to a plurality of nonvirtual controls within a training control cab, corresponding to and emulating a plurality of the operator-actuated controls of the physical control cab of the equipment, said nonvirtual controls being positioned in relation to a trainee position corresponding approximately to the location of the operator position in the physical control cab and from which the trainee operator can interact with said nonvirtual controls, each nonvirtual control being equipped with sensors to permit capture of operating values therefrom upon manual actuation of same and being operatively connected to the control bus of the computer, whereby the operating values from the nonvirtual controls are captured via the control bus for use by the training simulator software component. A video camera would also be connected to the computer and positioned to capture a view of the trainee operator in the trainee position and the positioning and orientation of the limbs of the trainee operator in relation to the nonvirtual controls, and generate a video signal data stream corresponding thereto which is captured via the control bus for use by the training simulator software component.

The training simulator software component as outlined would be responsible for the execution of the method of the present invention in conjunction with the components of the computer and the other control hardware connected to the control bus of the computer. The training simulator software component would be responsible for rendering the virtual environment which showed the operation of the equipment being trained in a virtual environment, and would contain the necessary programming and models to permit for the adaptation of the behaviour of the virtual versions of the equipment being operated and other entities within the environment based upon the capture of instrumentation values in respect of the nonvirtual controls in the training control cab etc. Adaptation of pre-existing virtual reality environment rendering or modelling software to accommodate these instrumentation captures and parameter value changes will be understood to those skilled in the art, as would be the programming of purpose built training simulator software, both of which approaches are contemplated within the scope of the present invention.

The software would facilitate the method of integrating nonvirtual controls in a VR training simulator when executed by the computer by, in conjunction with hardware components of the computer, on initiation of the method and throughout the time of training operation by the trainee operator, rendering and updating the view of the VR operating environment to the human display device, said view seen from the perspective of the operator of the equipment in the trainee position in the physical control cab and including:

the placement, behavior and operation of the virtual version of the equipment in relation to an operating area;

a virtual control cab of the equipment including rendered versions of at least each operator-actuated control, being rendered cab controls, showing current status of the rendered cab controls based on the corresponding nonvirtual controls in the training control cab; and the simulated view of the portions of the limbs of the trainee operator in relation to their position in the training control cab of the equipment and in interaction with each of the rendered cab controls, based upon the limb positioning of the trainee operator in relation to the nonvirtual controls in the training control cab.

When the trainee operator manually actuates any of the nonvirtual controls in the training control cab, the operating values corresponding to the manual actuation of the nonvirtual controls would be received by the control bus on the computer and translated into updated control parameters to be applied to the behaviour of the virtual version of the equipment within the VR operating environment, and the software would then update the rendering of the controls and the behaviour of the equipment and other entities within the virtual environment.

In addition to the rendering of the controls, the equipment being operated and other entities within the virtual environment, a key aspect of the method of the present invention is the rendering of the positioning of the portions of the limbs of the trainee operator in relation to the nonvirtual controls in the training control cab, into the virtual environment. On an ongoing basis during operation of the virtual version of the equipment by the trainee operator, the training simulator software component will apply an image recognition function to the video signal data stream to yield the necessary limb rendering data corresponding to the positioning and orientation of the limbs of the trainee operator in relation to the nonvirtual controls within the training control cab, to permit the rendering of virtual versions of the portions of the limbs of the trainee operator within the VR operating environment; and upon any movement of the limbs of the trainee operator resulting in modified limb rendering data, applying any updated limb rendering data to the rendering and behavior of the simulated versions of the portions of the limbs of the trainee operator within the VR operating environment. Using this additional functionality to render a view of the portions of the limbs of the trainee operator inside of the VR environment, so that the trainee operator will be able to see a rendered version of their limbs interacting with controls in the virtual control cab while physically feeling the actuation of the nonvirtual controls within the training control cab, will produce maximum training outcomes and results.

The training simulator software component could adjust the appearance of the simulated view of the portions of the limbs of the trainee operator within the VR operating environment in relation to the rendered controls, based upon the spacing of the trainee position in the training control from the nonvirtual controls. The spacing of the trainee position from the nonvirtual controls in the training control cab, and the positioning of the trainee operator themselves in relation to those controls, could be captured by the image recognition function applied to the video signal data stream from the camera or could be captured based upon additional instrumentation—in any event further adapting the view shown within the virtual reality operating environment based upon the positioning of the trainee operator in relation to the "dashboard" or nonvirtual controls provided in the training control cab will result in the ability to render the most accurate virtual view of the positioning of the operator in relation to the controls of the simulated equipment and other assets within the virtual environment, allowing for maximized memory imprinting and training outcomes.

In certain cases, the nonvirtual controls in the training control cab would also include force feedback mechanisms which could provide movement or other feedback to the operator in the training control cab—for example vibration or force feedback of a control switch, pedal, lever etc. The scope of force feedback behaviour which could be achieved or desired to be used will be understood to those skilled in the art. In any event, if the nonvirtual controls include force feedback mechanisms the control bus would potentially be a two-way communication pathway with those controls from the computer and the training simulator software component could be programmed to transmit force feedback signals via the control bus to one or more of the nonvirtual controls based upon the rendered behaviour of the equipment or other assets within the training environment.

In addition to the method and the software outlined herein, the invention also encompasses an equipment operation simulation system integrating nonvirtual controls in a virtual reality (VR) training environment for training a trainee operator in the operation of equipment having a physical control cab with a plurality of operator-actuated controls for use in operation thereof positioned in relation to an operator position. The system effectively comprises a computer with a related software component for execution of the method, a training control cab comprising a plurality of nonvirtual controls and a camera capturing and generating a data stream corresponding to an image signal which indicates the positioning of the trainee operator in the training control cab, and a control bus connecting the camera and nonvirtual controls to the computer.

The computer of the system of the present invention could be a purpose built simulator controller, or could be a standard computing device capable of operating the software of the present invention in conjunction with the remaining elements thereof and both such types of computers are contemplated within the scope of the present invention. The computer in any event would comprise a processor and memory along with a human display interface connected to the computer for the display to a trainee operator of a three-dimensional VR operating environment. The computer would also include either an integral or externally connected control bus for the capture of control inputs and video signal stream data by the computer for use in the rendering of the VR operating environment.

A training simulator software component programmed to render and display the VR operating environment in accordance with the remainder of the method would be installed and operable upon the computer. The training simulator software component could be any embodiment of training simulator software within the scope of the invention as otherwise outlined herein.

The system also in addition to the computer as outlined would include a training control cab, comprising a plurality of nonvirtual controls corresponding to and emulating a plurality of the operator-actuated controls of the physical control cab of the equipment being positioned in relation to a trainee position corresponding approximately to the location of the operator position in the physical control cab and from which the trainee operator can interact with said nonvirtual controls. Each nonvirtual control is equipped with sensors to permit capture of operating values therefrom upon manual actuation of same and being operatively connected to the control bus of the computer, whereby the operating values from the nonvirtual controls are captured via the control bus for use by the training simulator software component.

A video camera is also connected to the computer and positioned to capture a view of the trainee operator in the trainee position and the positioning and orientation of the limbs of the trainee operator in relation to the nonvirtual controls, and generate a video signal data stream corresponding thereto which is captured via the control bus for use by the training simulator software component. Various types of video cameras could be used and will be understood to all be within the intended scope of the present invention.

The system of the present invention will permit the execution of the method outlined elsewhere. In operation of the system the training system software component and computer will:

i. on initiation of the method and throughout the time of training operation by the trainee operator, render and update the view of the VR operating environment to the human display device within which the trainee operator can simulate the operation of a virtual version of the equipment, said view seen from the perspective of the operator of the equipment in the trainee position in the physical control cab and including:

ii. the placement, behaviour and operation of the virtual version of the equipment in relation to an operating area;

iii. a virtual control cab of the equipment including rendered versions of at least each operator-actuated control, being rendered cab controls, showing current status of the rendered cab controls based on the corresponding nonvirtual controls in the training control cab; and iv. the simulated view of the portions of the limbs of the trainee operator in relation to their position in the training control cab of the equipment and in interaction with each of the rendered cab controls, based upon the limb positioning of the trainee operator in relation to the nonvirtual controls in the training control cab;

when the trainee operator manually actuates any of the nonvirtual controls in the training control cab:

i. translate operating values corresponding to said manual actuation received via the control bus into updated control parameters to be applied to the behaviour of the virtual version of the equipment within the VR operating environment; and ii. apply any updated control parameters to the rendering and behaviour of the virtual version of the equipment and the corresponding rendered cab controls within the virtual control cab;

on an ongoing basis during operation of the virtual version of the equipment by the trainee operator:

i. apply an image recognition function to the video signal data stream to yield the necessary limb rendering data corresponding to the positioning and orientation of the limbs of the trainee operator in relation to the nonvirtual controls within the training control cab, to permit the rendering of virtual versions of the portions of the limbs of the trainee operator within the VR operating environment; and ii. upon any movement of the limbs of the trainee operator resulting in modified limb rendering data, apply any updated limb rendering data to the rendering and behavior of the simulated versions of the portions of the limbs of the trainee operator within the VR operating environment;

During operation of the virtual version of the equipment within the VR operating environment, the trainee operator will be able to see a rendered version of at least portions of their limbs interacting with controls in the virtual control cab while physically feeling the actuation of the nonvirtual controls within the training control cab. The system of the present invention could comprise multiple embodiments as outlined throughout—it will be understood that any embodiment of the system of the present invention which achieves the varying embodiments of the method outlined above and herein will be within the scope of the present invention.

In certain embodiments of the system, the nonvirtual controls in the training control cab could contain force feedback mechanisms to allow the trainee operator to receive force feedback via those nonvirtual controls from the computer during execution of the method. The nonvirtual controls contain force feedback mechanisms could communicate in a two-way fashion with the computer by the control bus to receive the necessary actuation signal to provide force feedback in such embodiments to the user.

As outlined throughout, one of the key aspects of the method of the present invention is that the rendering software component will adjust the appearance of the simulated view of the portions of the limbs of the trainee operator within the VR operating environment in relation to the rendered cab controls based upon the spacing of the trainee position in the training control cab from the nonvirtual controls. Any embodiment of the system of the present invention which will achieve this, where the trainee position is instrumented to identify its location to the server and the software component by the control bus, or where the trainee position can be detected by the image recognition function applied to the signal from the camera, is also contemplated within the scope of the present invention. As outlined, it is specifically contemplated that the computer and related software component would render the appearance of the portions of the limbs of the trainee operator inside the environment, as they are positioned and interact with the virtual controls therein for the equipment and any such specific combination of hardware and software which achieves this objective is explicitly contemplated within the scope of the present invention.

The human interface device that comprises a component of the computer of the system of the present invention could be any type of a virtual reality display device used in conjunction with the computer. It is specifically contemplated however that the human interface device in most embodiments would comprise a helmet or goggle type display as is used for virtual reality gaming and the like. Any type of a display capable of displaying the rendered virtual reality simulation of the operation of the equipment by the trainee operator will be understood to be intended to be within the scope of the present invention.

The control bus as a component of the computer of the system of the present invention could comprise an integral control bus hardware and software combination whereby the instrumentation of the nonvirtual controls, and the camera, could be connected directly to the computer—for example by a USB connection or the like—an integral control bus is most likely where a computer, gaming controller or the like is used as the electronic heart of the system which can be purpose built for the operation of the method. In alternative embodiments of the system of the present invention, the control bus might itself comprise an externally connectable hardware interface, which could singularly be connected to the computer or controller and in turn permit the connection of the remainder of the system components to the computer. By making the control bus an externally connectable device, the system of the present invention could retrofit an existing computer or gaming controller. Both such approaches are contemplated within the scope of the present invention, along with any type of necessary modification to the software component to accommodate the capture and use of control inputs and other parameters via the control bus.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labelled with like numerals, and where:

DETAILED DESCRIPTION OF ILLUSTRATED EMBODIMENTS

As outlined, the invention comprises a method and system for the integration of nonvirtual controls into a virtual reality training simulator and training environment for use in training of operators in the operation of equipment. The equipment which operation is being trained is typically equipment having a physical control with a plurality of operator actuated controls. The equipment might comprise a stationary or non-motive piece of equipment, or might in other situations comprise a motive machine, part of the training for operation of which is the operation of the driving activity of the unit. Both such approaches will be understood to be within the scope of the present invention.

The overarching concept of the present invention is that the operator being trained can actually physically interact with nonvirtual controls in the simulated control of the equipment in question, and the system will render images of at least a portion of the limbs of the operator interacting with the nonvirtual controls in relation to virtual controls inside the control cab in the virtual reality environment. Effectively, the trainee operator will receive enhanced training in the operation of the equipment in question insofar as they will gain sensory and tactile feedback from the nonvirtual controls within the control of the system which will permit faster or stronger imprinting of the feeling of the controls to the operator such that they will have an easier transition into the cockpit environment of the actual equipment when they graduate from the training simulator. It will be understood to those skilled in the art and viewing this specification that there are various types of modifications, changes and enhancements which could be made to the overarching concept of the invention disclosed without departing from the intended scope, and all such modifications are intended to be considered to be within the scope of the claims and the present invention.

Figure 1:
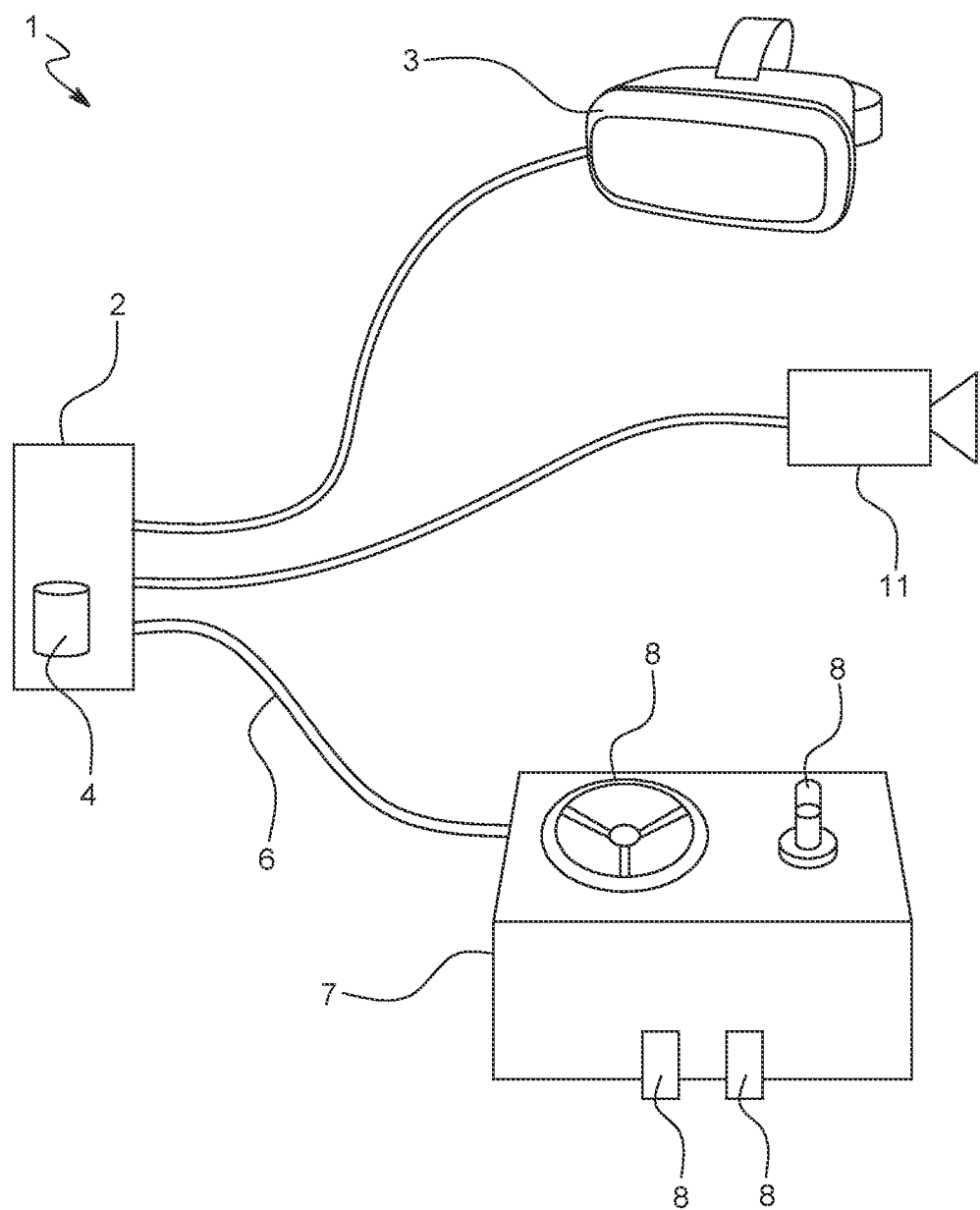
FIG. 1 is a block diagram of the components of one embodiment of a system of the present invention, wherein the control bus is integral to the computer, and the physical equipment for which the system is configured to train is a forklift.

System Overview:

The method of the present invention is accomplished using a computer system to provide a simulated virtual reality training environment for a training operator in the operation of certain equipment. The system itself, as will be understood to those skilled in the art of virtual-reality systems and environments, comprises a computer system capable of rendering the desired virtual-reality training environment for viewing by the trainee operator. FIG. 1 is a schematic diagram of a first embodiment of a system 1 in accordance with the present invention.

The system 1 comprises a computer 2 with a human display interface 3 connected thereto, for the purpose of displaying to a trainee operator a three-dimensional VR operating environment. The human display interface 3 could be a set of virtual-reality goggles, and immersive monitor or screen, or many other types of display interfaces capable of displaying a rendered virtual-reality environment to a user. Any type of a human display interface 3 capable of this display in accordance with the remainder of the method is contemplated within the scope of the present invention. In the embodiment of FIG. 1, the human display interface 3 is shown as a set of virtual-reality goggles.

The computer 2 might consist of one or more computers 2. The computer 2 would comprise one or more processors and memory. The memory might contain various software components or a series of processor instructions for use in the method of the present invention or otherwise in the operation of the computer 2.

Memory may comprise non-transitory storage media that electronically stores information. The electronic storage media of memory may include one or both of system storage that is provided integrally (i.e., substantially non-removable) with computer(s) 2 and/or removable storage that is removably connectable to computer(s) 2 via, for example, a port (e.g., a USB port, a firewire port, etc.) or a drive (e.g., a disc drive, etc.). Memory may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory may include one or more virtual storage resources (e.g., cloud storage, a virtual private network, and/or other virtual storage resources). Memory may store software algorithms, information determined by processor(s), and/or other information that enables computer(s) 2 to function as described herein.

Processor(s) may include one or more of a digital processor, an analogue processor, a digital circuit designed to process information, an analogue circuit designed to process information, a state machine, and/or other mechanisms for electronically processing information. In some implementations, processor(s) may include a plurality of processing units, including graphic cards or rendering subsystems. These processing units may be physically located within the same device, or processor(s) may represent processing functionality of a plurality of devices operating in coordination.

The computer 2 in addition to its typical processor and memory components would host a rendering software component 4, programmed to render and display the VR operating environment in accordance with the remainder of the method to a trainee operator 5 via the human display interface 3.

The computer 2 would also include a control bus 6 for the capture of control inputs by the computer 2 for use in the rendering of the VR operating environment. The control bus 6 would be connectable to the training control cab 7 outlined below. The control bus 6 might comprise a pre-existing interface on the computer 2, such as a USB interface or the like, or might also in other embodiments comprise a purpose-built hardware device for the purpose. Both such approaches are contemplated within the scope of the present invention.

The computer 2, via the control bus 6, would be connected to a training control cab 7. The training control cab 7 is effectively at least one hardware device comprising a tactile nonvirtual simulated control, for the use of the trainee operator in simulated operation of the equipment inside of the VR training environment. The training control cab would comprise a plurality of nonvirtual controls 8 each of which corresponds to and emulates an operator actuated control of the physical control cab of the simulator, which the trainee operator is being trained to operate. The embodiment of the system shown in FIG. 1 is a system for use in training a trainee operator to operate a forklift. The training control cab 7 shown includes four nonvirtual controls 8, namely a steering wheel, a lifting joystick, and 2-foot pedals. It will be understood that any number of nonvirtual controls 8 could be included in a particular training control cab 7 to be used in conjunction with the remainder of the system and method of the present invention. Certain embodiments of the training control cab 7 might include fewer or more nonvirtual controls 8 dependent upon the level of specificity or granularity desired to be provided in the training by the system and method of the present invention. The training control cab 7 might also be manufactured for example to provide a reasonably generic set of controls similar to different brands of actual equipment for which training operators are being trained, or the training control cab 7 could be specifically manufactured with nonvirtual controls 8 configured to be as similar as possible to the actual controls in the operator cab of the specific brand of a type of equipment being operated. In the example of a forklift for example, such as shown in FIG. 1, a generic training control cab 7 could be provided which would provide a number of nonvirtual controls 8 which were generically capable of allowing a trainee operator to train for operation of different brands of forklifts, or in other embodiments, the training control cab 7 might be specifically matched to the specific operator control cab of a particular actual piece of equipment in respect of which training is taking place. Any such approach is contemplated within the scope of the present invention.

The nonvirtual controls 8 are positioned, in the operational configuration of the system, in relation to a trainee position 10 which corresponds approximately to the location of the operator position in the physical control cab of the actual equipment in respect of which training is taking place and from which the trainee operator can interact with the nonvirtual controls 8. The nonvirtual controls 8 could be positioned in relation to a seat for example from which the method and system could be operated and which would most closely simulate being seated in the operator cab of the forklift of FIG. 1. For other equipment operation scenarios, the operator might actually stand in operation of the actual equipment and so the trainee position 10 might be a marked position on the floor at which the operator could stand to engage with the components of the training control cab 7. The nonvirtual controls 8 within the training control cab 7 of any embodiment of the system of the present invention could include any number of types of different simulated controls which could be used for the purpose of capturing operator inputs from the trainee operator to the computer 2 by the control bus 6, to provide data points for use in the rendering of the virtual reality environment demonstrating the operation of the equipment being operated.

For example, where the equipment being operated in the VR training environment includes locomotive functions, the nonvirtual controls 8 in the training control cab 7 could include locomotion controls to simulate the control of movement of the equipment—for example a steering wheel, brake or accelerator pedals or levers or the like, or any number of other type of controls which would be used to actuate the movement of the equipment being trained. The only limitation to a particular nonvirtual control 8 would be that it be capable of being equipped with sensors or instrumentation to permit the capture of operating parameters onto the control bus 6 for use by the rendering software component 4 in the ongoing rendering of the VR training environment.

The nonvirtual controls 8 would either be separately powered by a power supply, or would receive power to actuate the sensors and instrumentation for the purpose of capturing operating values from the control bus 6. Nonvirtual controls 8 using a separate power supply, or drawing power for their circuitry from the control bus 6 are both contemplated within the scope hereof.

Where the equipment being operated in the VR training environment included non-locomotive functions, the nonvirtual controls 8 in the training control cab 7 could include process controls to simulate the operation of those non-locomotive equipment functions as well.

There may also be certain embodiments of the system of the present invention in which a particular training control cab 7 was equipped with more artificial controls than just the plurality of nonvirtual controls 8 required for operation of the system of the present invention. For example, it may be the case that the system would only incorporate nonvirtual controls 8 for a plurality of the most important equipment functions in the training control cab 7, while providing additional non-connected or dummy controls for the purpose of providing a more fully visibly equipped dashboard for example or the like to further permit the training operator with their fingers, feet etc. to better learn to navigate and manipulate the controls of the equipment being operated.

Figure 3:
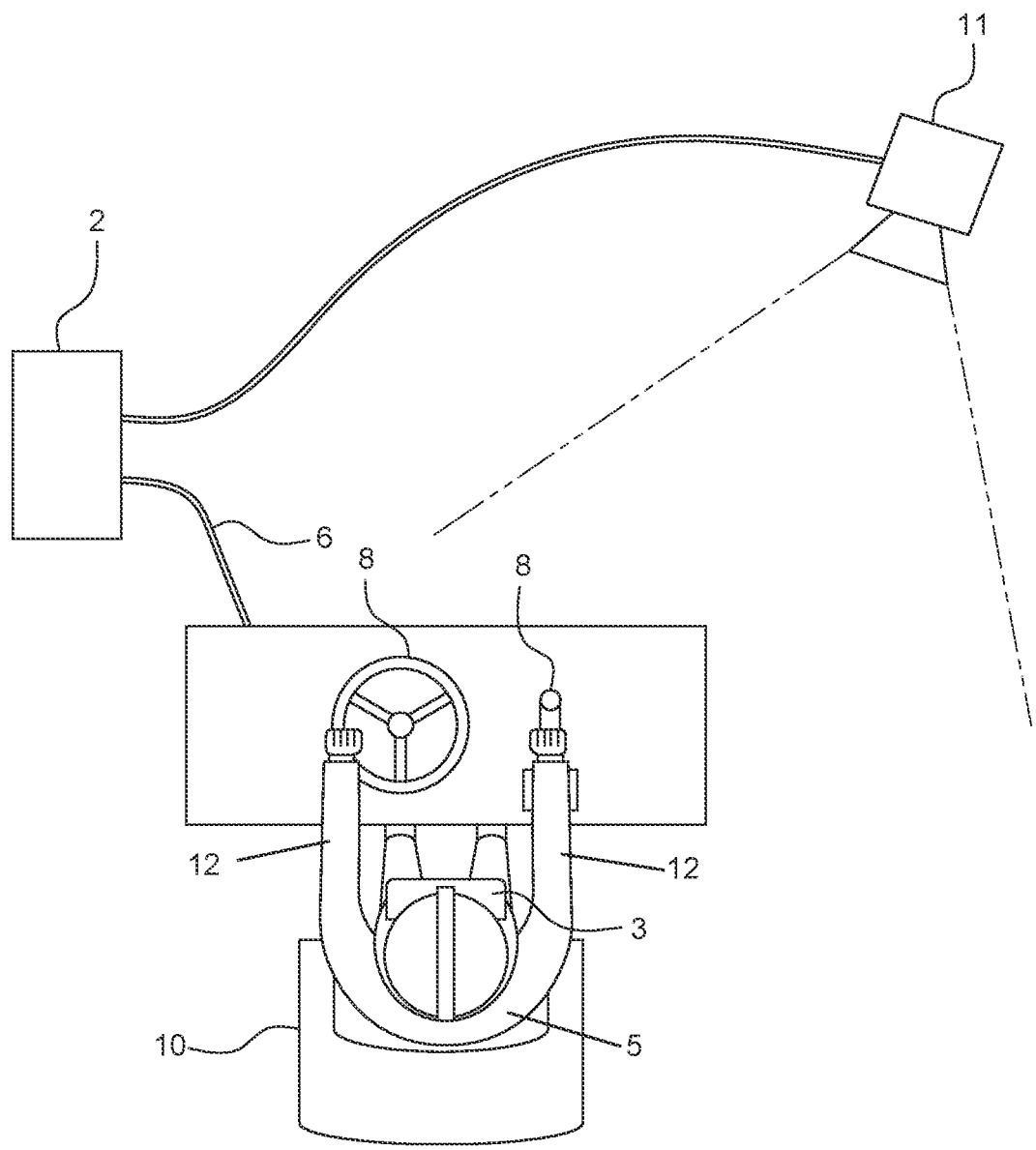
FIG. 3 is a top view of a configured installation of FIG. 1, showing the trainee operator in relation to the training control cab and other components, wherein the trainee position comprises an operator's seat and the camera is shown operated viewing the trainee position from the front.
Figure 3A:
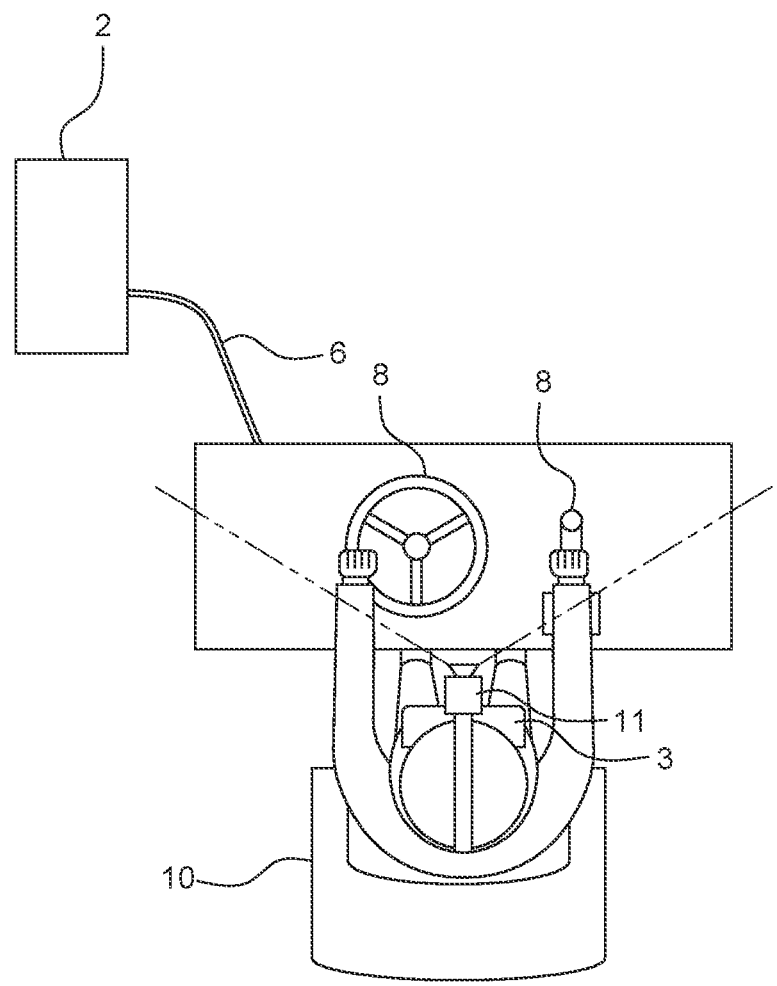
FIG. 3A is a top view of an alternate installation of FIG. 1 to that of FIG. 3, showing the trainee operator in relation to the training control cab and other components wherein the camera is mounted on the top of the human display interface/virtual reality helmet.
Figure 4:
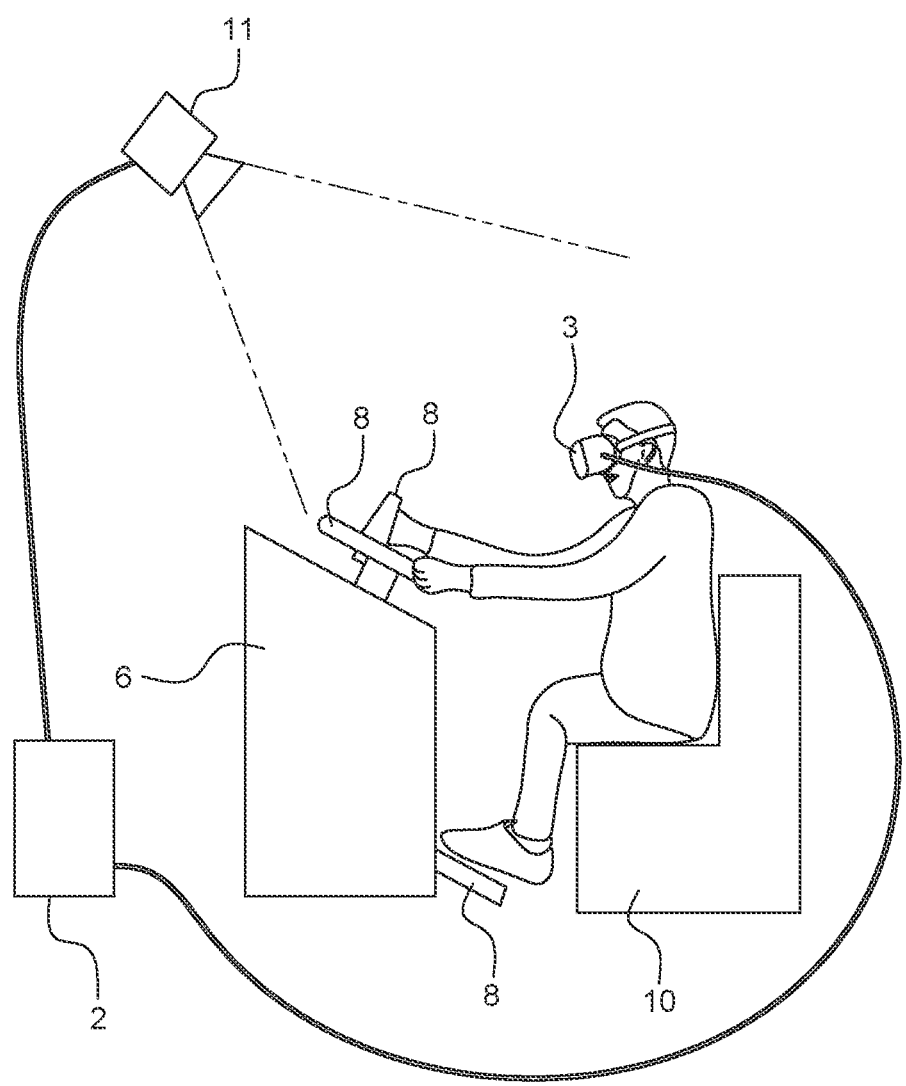
FIG. 4 is a side view of the installation of FIG. 3.
Figure 4A:
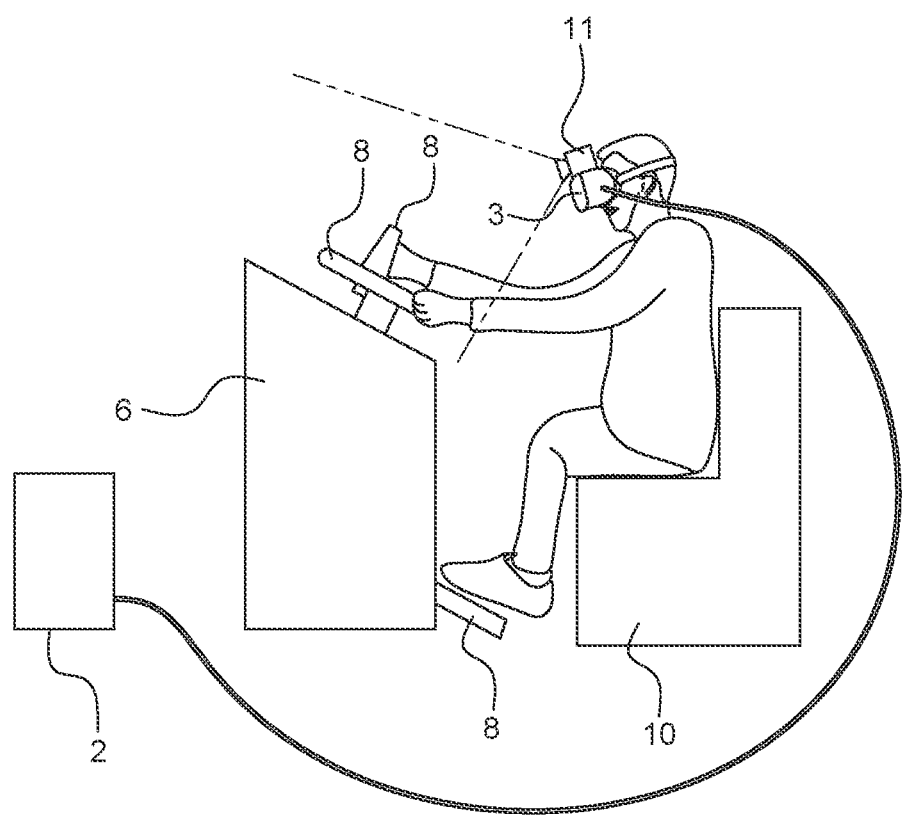
FIG. 4A is a side view of the installation of FIG. 3A.

In addition to the system configuration diagram of FIG. 1, FIG. 3 and FIG. 4 demonstrate a top-down and a side view of the system of FIG. 1 demonstrating all of the components and their position in relation to each other in operation of the system including the trainee operator etc. The trainee position 10 in the case of the embodiment shown comprises an operator's seat. As outlined throughout, there are other embodiments in which the trainee position 10 might she just be a standing area for equipment which is to be operated from a standing up position or other approaches as well. Shown in these Figures, the camera 11 has a view of the trainee position 10 from the front, where it could view the trainee operator in the trainee position 10 to provide the necessary video signal data stream. An alternate embodiment is shown in FIGS. 3A and 4A, wherein the camera 11 is mounted to the top of the human display interface 3. It will be understood that the mounting of the at least one camera could be in many positions in relation to the trainee position, so long as the video signal captured and rendered by the camera 11 had a view of the at least partial limbs of the operator for the purpose of facilitation of the rendering of the environment and the remainder of the method.

As described in further detail elsewhere below, the trainee position 10 where it comprises a seat for example could also be configured to be movable in relation to the training control cab 7—for example the simulator could include a movable and configurable operator seat, to allow the operator to position themselves just the way they would be positioned in the operator cab of the actual equipment, and the method of the present invention in the software, as outlined elsewhere herein, could be allowed to adjust for the positioning of the trainee operator and the trainee position 10 to modify the rendering of the limbs of the operator in the virtual training environment.

Figure 2:
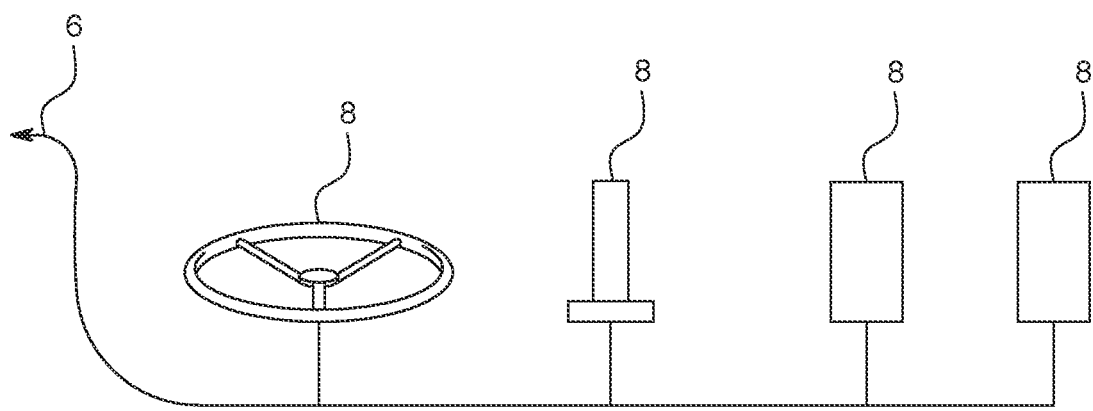
FIG. 2 is a detailed schematic showing the connection of the nonvirtual controls of the control cab of FIG. 1 to the control bus.

Each of the nonvirtual controls 8 would be equipped with sensors or other digital or analog instrumentation capable of capturing operating values therefrom, when the nonvirtual control 8 is manually actuated by the trainee operator. The operating values in respect of each nonvirtual control 8 would be captured via the control bus 6 for use by the training simulator software component 4 and the remainder of the method. For example, where the nonvirtual control 8 comprised a steering wheel for steering a motive piece of equipment, the instrumentation of the nonvirtual control 8 would permit for the capture of rotational values of the wheel by the control bus 6, so that the computer 2 at the software component 4 could simulate the steering and altered movement of the equipment inside of the virtual environment based upon steering inputs from the tactile nonvirtual steering wheel control 8. Any number of different types of tactile nonvirtual control instrumentation to permit the capture of operating values indicating actuation or positioning of the nonvirtual control 8, which could be translated into a digital value for receipt by the computer 2 via the control bus 6, will be understood to those skilled in the art and are all contemplated within the scope of the present invention. FIG. 2 is a detailed view of the physical control cab 7 of FIG. 1, demonstrating the connection of the control bus 6 to the operating value instrumentation of each nonvirtual controls 8.

The system or the training control cab 7 also includes a video camera 11 connected to the computer 2 and positioned to capture a view of the trainee operator in the trainee position 10, along with the positioning and orientation of the limbs 12 of the trainee operator in relation to the nonvirtual controls 8. The video camera 11 will generate a video signal data stream corresponding to its view which is captured by the control bus 6, again for use by the training simulator software component 4 and the remainder of the method. Any video camera 11 capable of capturing a view of the trainee operator at the trainee position 10 and specifically capturing a view of the limbs 12 of the trainee operator in relation to the nonvirtual controls 8 which will yield a video signal data stream which can be subjected to image processing to recognize and render the limbs 12 of the trainee operator inside the VR environment will be understood to be within the scope of the present invention. The camera 11 might be connected directly and separately to the computer 2, or in other cases might be connected via the control bus 6 and the remainder of the control cab 7—either such approach is contemplated within the scope of the present invention. Also, there are conceivable embodiments of the system of the present invention in which more than one video camera could be used.

As outlined elsewhere herein, the control bus 6 for connection of the control cab 7 could be an internal pre-existing connection on the computer 2, such as the USB bus, a serial port or the like, or it is also possible that the nonvirtual controls 8 could even have network conductivity to the computer 2 by a network interface being the control bus 6.

It is also specifically contemplated that the control bus 6 could comprise a purpose-built external hardware device for connection to the computer 2.

In terms the computer 2 itself it is specifically contemplated that the computer 2 might comprise any type of a PC or a server capable of hosting the software component 4 and comprising or operably connectable to a control bus 6. The specific hardware configurations for computers 2 capable of facilitating the method of the present invention will be understood to those skilled in the art of virtual reality software design and operation, and any such hardware configurations of computers 2 are contemplated within the scope of the present invention.

Method Overview:

The system 1 as shown for example in the embodiment of FIG. 1, would be used to execute the method of the present invention. The method would be executed by the computer 2, using the rendering software component 4. On initiation of the method and throughout the time of training operation by the trainee operator, the rendering software component 4 would render and update the view of the VR operating environment in the human display device 3 from the viewing perspective of the trainee operator, by which the trainee operator can simulate the operation of a virtual version of the equipment. Again, as outlined, the view shown within the human display device 3 would be the view seen from the perspective of the operator of the equipment in the trainee position 10 in the physical control cab of the simulated actual equipment. The view shown would include the placement, behaviour and operation of the virtual version of the equipment in relation to an operating area, as well as a virtual control cab of the equipment which includes rendered versions of at least each operator actuated control 8 within the training control cab 7—being the rendered Controls. The rendered Controls would be shown in the view within the VR environment by showing their current status based upon the corresponding nonvirtual controls 8 in the training control cab 7.

In addition to showing the rendered cab controls, the display shown within the human interface 3 would include the simulated view of at least portions of the limbs of the trainee operator in relation to their position in the training control cab 7 and in interaction with the rendered Controls as physically sensed and represented by the actual limbs of the trainee operator in relation to the nonvirtual controls 8.

On initiation and throughout the time of training operation, the rendering software component would render and update the view of the VR operating environment based on the operating parameters of the nonvirtual controls 8 received by the control bus 6 as well as based upon the positioning of the limbs of the trainee operator in respect of the training at operator position 10 as captured by the camera 11. Additionally, the rendering software component 4 would have the necessary processor instructions therein to allow for the rendering and display of the actual simulated operation of the equipment being operated based upon those operating parameters of the nonvirtual controls 8—for example, the rendering software component 4 could render additional entities within the virtual reality environment i.e. operating obstacles, items being lifted or moved etc. Basically, the rendering software component 4 will be capable of the necessary computations and graphical rendering to simulate and display the placement, behaviour and operation of the virtual version of the equipment in relation to the operating area.

The design of a rendering software component 4 capable of providing a simulated real-time operating session of the equipment in question, including the rendering and display of additional entities beyond the equipment itself as required to permit and facilitate the simulated operation of the equipment in a particular operating area, will be understood to those skilled in the art of software design in this field and any software of this nature is contemplated within the scope of the present invention.

During the operation of the virtual version of the equipment by the trainee operator, when the trainee operator manually actuates any of the nonvirtual controls 8 in the training control cab 7, the operating values of the actuated nonvirtual controls 8 will be translated onto the control bus 6 for use by the computer 2 and the rendering software component 4 as updated control parameters to be applied to the behaviour of the virtual version of the equipment being operated within the VR operating environment. Upon the receipt of any updated control parameters at the computer 2 they will be applied to the rendering and behaviour of the virtual version of the equipment and the corresponding rendered cab controls within the virtual control cab. Updated control parameters would be used to update the displayed version of the rendered cab controls to demonstrate their up-to-date positioning for example, as well as to update the behaviour of the equipment or other entities within the VR operating environment based upon the control adjustment to the nonvirtual controls 8 by the trainee operator.

Also, during the training session on an ongoing basis, during operation of the virtual version of the equipment by the trainee operator, the rendering software component 4 will apply an image recognition function to the video signal data stream to determine the necessary data points to yield the necessary limb rendering data corresponding to the positioning and orientation of the limbs of the trade he operator in relation to the nonvirtual controls within the training control. This will permit the rendering of virtual versions of at least portions of the limbs of the trainee operator in relation to the virtual controls 8 within the VR operating environment. The image recognition function would be applied to the video signal data stream from the camera 11 ongoing basis.

Upon the detection by the rendering software component and the image recognition function of any detectable or measurable movement of the limbs of the trainee operator, modified limb rendering data can be calculated by the rendering software component 4 and a modified limb rendering data can then be used by the rendering software component 4 to apply and re-render or regenerate the behaviour of the rendered versions of the at least portions of the limbs of the trainee operator shown within the VR operating environment in relation to virtual control cab. During operation of the virtual version of the equipment within the VR operating environment, the trainee operator will be able to see a rendered version of at least portions of their limbs interacting with controls in the virtual control cab while physically feeling the tactile feedback and actuation of the nonvirtual controls within the training control cab.

Figure 7:
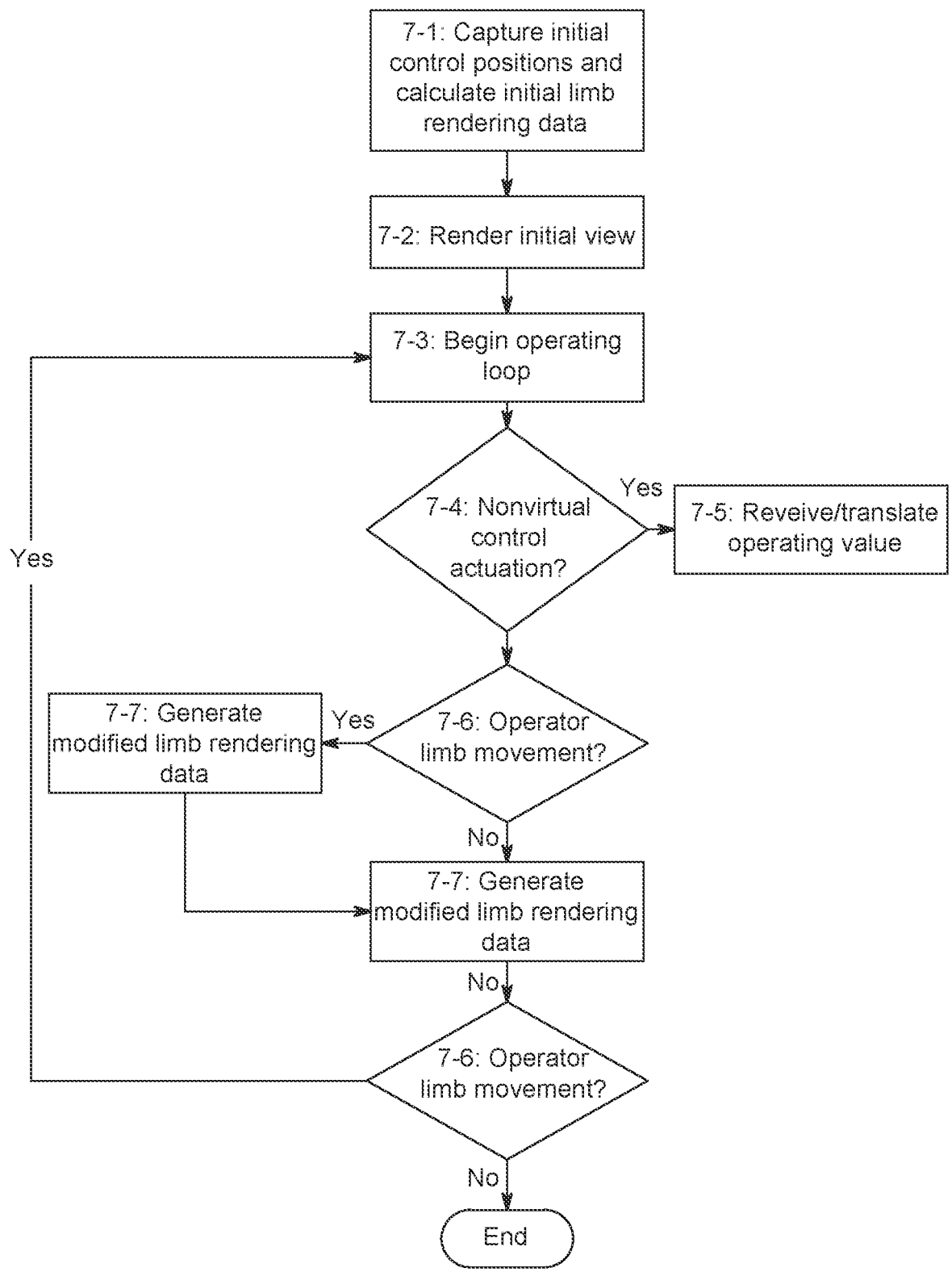
FIG. 7 is a flow chart demonstrating the steps involved in one embodiment of the method of the present invention.

FIG. 7 is a flowchart demonstrating the steps of one embodiment of a method in accordance with the present invention, which is described as follows for the sake of further enablement.

In initiating the method, using a system such as that shown in FIG. 1 or otherwise, the first step would be to capture the initial control positions of the virtual controls 8 within the training control cab 7, as well as to calculate a set of initial limb rendering data based on the video signal data stream from the camera 11. The computer 2 would receive the operating values and the video signal data stream from the nonvirtual controls 8 and the camera 11 and the rendering software component could use the operating values captured in respect of the nonvirtual controls 8 to calculate the initiation of operation of the equipment within the virtual training environment. By applying an image processing function to the video signal data stream, the rendering software component 4 could also calculate the necessary limb rendering data to render virtual representations of at least portions of the limbs of the trainee operator in relation to the virtual controls 8. The image processing function could determine the location, orientation etc. of the limbs of the trainee operator in relation to the remainder of the training control cab 7 by applying image recognition or other image processing functionality understood to those skilled in the art to the video signal data stream. By recognizing the positioning and orientation of the limbs or digits etc. of the trainee operator within the view contained in the video signal data stream, the image processing function could yield the necessary data to permit the rendering of virtual representations of at least portions of at least one of the limbs of the trainee operator inside the virtual operating environment, in their same position in relation to the nonvirtual controls 8. The capture of initial control positions and the calculation of the initial limb rendering data is shown at step 7-1.

Following the capture of the initial control positions and the calculation of initial limb rendering data, the rendering software component 4 would render the initial virtual reality view inside the training environment, for display on the human display interface 3. The rendering software component 4 would use the operating parameters corresponding to the initial control positions as well as the initial limb rendering data to render a view inside of the human display interface 3 placing the trainee operator in the operating position of the virtual equipment being operated inside of the VR environment. The rendering software component 4 and the remainder of the data stored on the computer could be sufficient for the purposes of permitting the trainee operator to look around inside of the VR environment outside of the virtual cab of the virtual version of the equipment and to see other entities within the environment including other components of the equipment, other obstacles etc. to all sides of the equipment, but when the operator looked back towards the front of the operating position and cab, towards the rendered cab controls, they would see portions of their limbs in communication or position in relation to those virtual/rendered cab controls. Following the rendering of the initial view, shown at step 7-2 the rendering software component 4 would continually update the positioning of any entities within the VR environment as required, depending upon the operating values and limb rendering data as well as depending upon the sensed orientation etc. of the human display interface 3—for example, in addition to tracking and updating on an ongoing basis the positioning and behaviour of entities within the virtual reality environment based upon control parameters etc., typical VR simulators such as these can sense the orientation or position of the view of the trainee operator—for example if they are wearing a virtual reality goggle or helmet, the virtual reality goggle or helmet can identify to the computer 2 and the rendering software component 4 the orientation and view of the trainee operator—so that not only the behaviour of entities within the VR environment but the actual current view to be seen through the goggle or the helmet etc is adjusted based upon the positioning of the physical body and physical viewing direction of the trainee operator.

The embodiment of the method shown in FIG. 7 next shows an operating loop, starting at 7-3. This would be the operating session of the virtual reality simulator by the trainee operator, having positioned themselves in the operator position in relation to the nonvirtual controls 8. During the operating loop, the rendering software component 4 would monitor the control bus and any detected changes in the video signal data stream. If the computer 2 and the rendering software component 4 detected the actuation of the nonvirtual control 8 via the control bus 6, shown at step 7-4, the computer 2 would receive and translate the new operating values for the actuated nonvirtual control 8—the new sensor or instrumentation positions of the nonvirtual control 8 having been actuated would be translated into data which could be used by the rendering software component 4 in the rendering of the virtual reality view inside the training environment. This is shown at step 7-5—following the detection of such a change and the receipt and translation of new operating values converted into operating parameters for use in the rendering of the virtual reality environment, the loop would continue. Similarly, within the operating loop if no actuation of the nonvirtual control 8 were detected at step 7-4, the monitoring loop and activity loop would also continue.

The next detection step shown in the operating loop of FIG. 7 is a detection of an operator limb movement, shown at step 7-6. The rendering software component forward on an ongoing basis be applying the image recognition function to the video signal data stream received from the camera 11 and based upon the image recognition detection aspect of that function if one or more of the limbs of the trainee operator in the actual training control cab 7, in relation to the nonvirtual controls and related, were detected to move or be reoriented either generally or as a part of the actuation of the nonvirtual control 8, the new positioning and orientation of a lien following movement would need to be determined.

If a limb movement has been detected, the rendering software component that is shown at step 7-7 would generate modified limb rendering data based upon the current detected state of the position or orientation of the limbs of the trainee operator within the training control cab 7.

Shown next in the method of FIG. 7, at step 7-8, is the recalculation of a re-rendering of the display in the virtual environment on the human display device 3 accessed by the trainee operator. Changes in the limb rendering data, operating values of the nonvirtual controls 8, or any other ongoing entity behaviour calculations or adjustments as programmed in the rendering software component 4 with respect to the typical operating behaviour of the equipment and other entities within the VR environment [i.e. for example, if the virtual version of the equipment being operated was a motive device and movement of the device in a particular direction had been initiated by the trainee operator using the nonvirtual controls 8, the system would track the ongoing positioning, speed and orientation of the virtual version of the equipment and continuous movement until control changes were made etc.] would all result in changes to the display shown to the trainee operator. The rendering of a useful VR environment for training purposes, showing the operation of a virtual version of equipment within a virtual environment including even for example other moving devices or entities which need to be avoided, steered around etc. will all be understood to those skilled in the art of the design of virtual reality programming of this nature and are all contemplated within the scope of the invention. The key aspect of the invention is that the trainee operator would see at least portions of their limbs interacting with the rendered cab controls inside of the virtual environment as their actual limbs interacted with the nonvirtual controls 8 within the training control cab 7.

It will be understood that the specific ordering of steps in embodiments of the overarching method of the present invention could be programmed to behave in a different order or fashion without departing from the intended scope and intention here of and any such modifications are intended to be within the scope of the present invention regardless of our example of the timing or ordering of the capturing of limb movement or control actuation during the operation of the virtual environment or the resulting rendering of adjusted appearance of entities therein.

Rendering Software Component:

The rendering software component 4 is any virtual reality engine capable of rendering a three-dimensional virtual environment/display from the view or perspective of the trainee operator of a particular virtual piece of equipment. The software component 4 could be custom written or there may also be pre-existing rendering software components 4 which can be customized to accommodate the method of the present invention by using the captured limb rendering data and operating value data of the limbs of the trainee operator and the nonvirtual controls. Both such approaches are contemplated within the scope of the present invention.

As will be understood to those skilled in the art of virtual reality programming, in addition to displaying the behaviour of the virtual copy of the equipment being operated by the trainee operator within the virtual environment, there will be other entities in most cases that will also need to be displayed—other moving or static assets that need to be avoided or addressed in a particular way in operation of the virtual equipment, loads to be lifted or moved etc. Any type of entities or assets which need to be programmed within such an environment to provide a robust set of potential operating circumstances for the virtual equipment being trained will all be understood to be within the scope of the present invention.

Figure 5A:
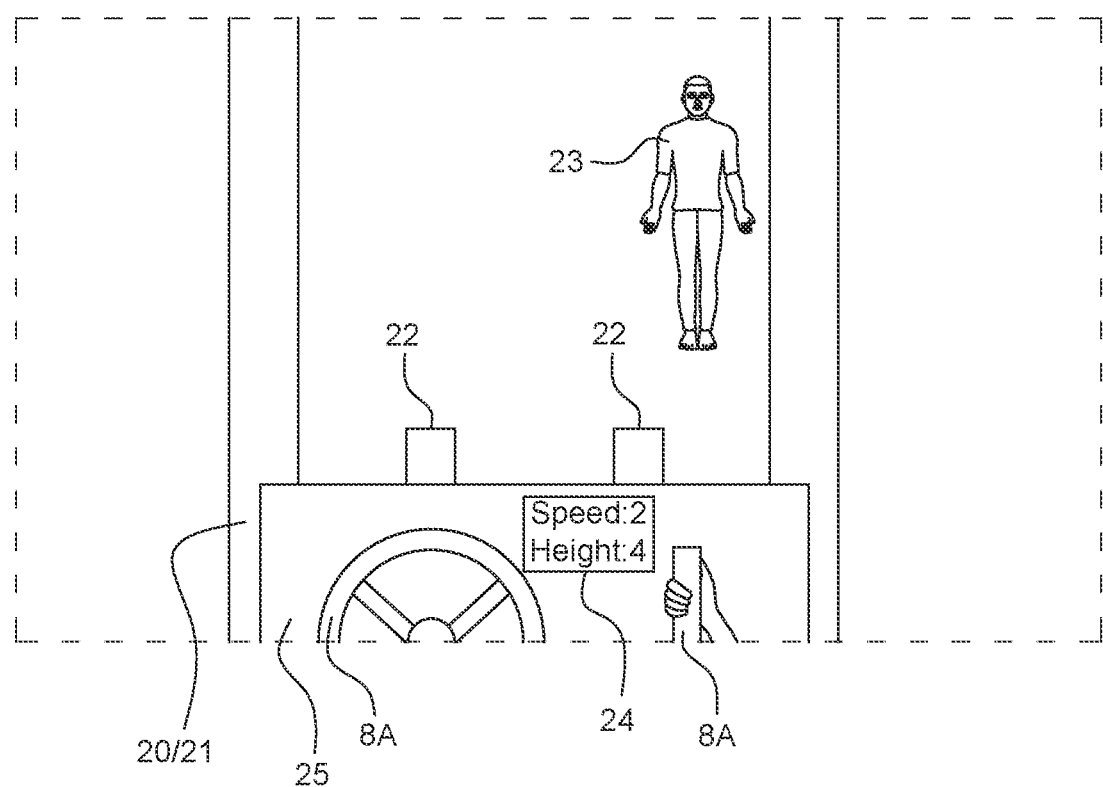
FIG. 5A is a first sample view inside a virtual reality simulator environment showing the simulated operation of a forklift in accordance with the embodiment of FIG. 3.
Figure 5B:
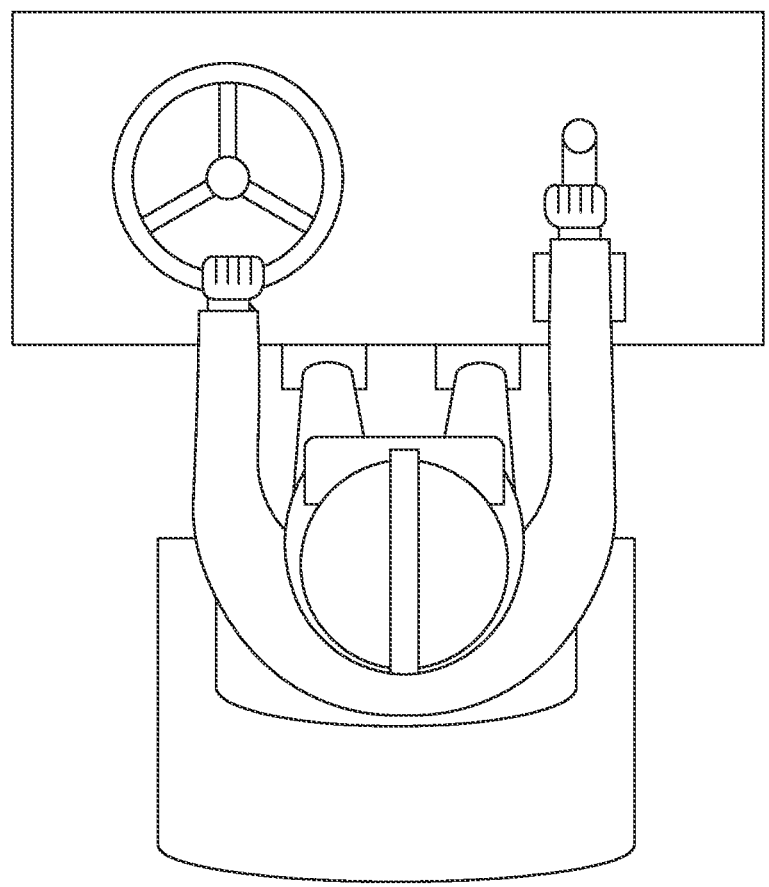
FIG. 5B is a top view of the embodiment of the system showing the positioning of the actual limbs of the trainee operator in relation to the nonvirtual controls, shown in rendered form in FIG. 5A.

FIGS. 5A and 5B, and 6A and 6B, are intended to demonstrate two different simulated virtual reality views within the human interface displayed 3, to demonstrate the behaviour of the method of the present invention. FIG. 5A shows a virtual reality view rendered in accordance with the remainder of the present invention, and FIG. 5B is a top-down view of the embodiment of the system of the present invention related to the virtual reality view shown in FIG. 5A, demonstrating the orientation of the trainee operator in relation to the nonvirtual controls etc.

The view of FIG. 5A, generated based upon the current control settings of FIG. 5B, shows a forklift with no load—as can be seen by the orientation of the head of the operator in FIG. 5B, the view is effectively looking straight ahead of the front of the forklift 20. The upward lifting structure of the forklift is also shown at 21. The two empty forks extending out the front of the forklift 20, as would be seen at their tips without looking down are shown at 22. An independent asset or entity, being a person shown as an obstacle to be steered around at 23 is also shown.

The steering whale and the control joystick for the forklift are shown—as rendered cab controls 8A which correspond to the nonvirtual controls 8 in the actual training cab 7, with a portion of the hand of the trainee operator shown in position on the control joystick. Other parameters including the speed and load height of the forklift 20 etc. could either be shown elsewhere on the display for viewing by the trainee operator, or as shown are demonstrated in a dashboard type display 24 on the dash 25 of the forklift. Additional controls or information, or rendered cab controls, could be shown on the dashboard 25.

Figure 6A:
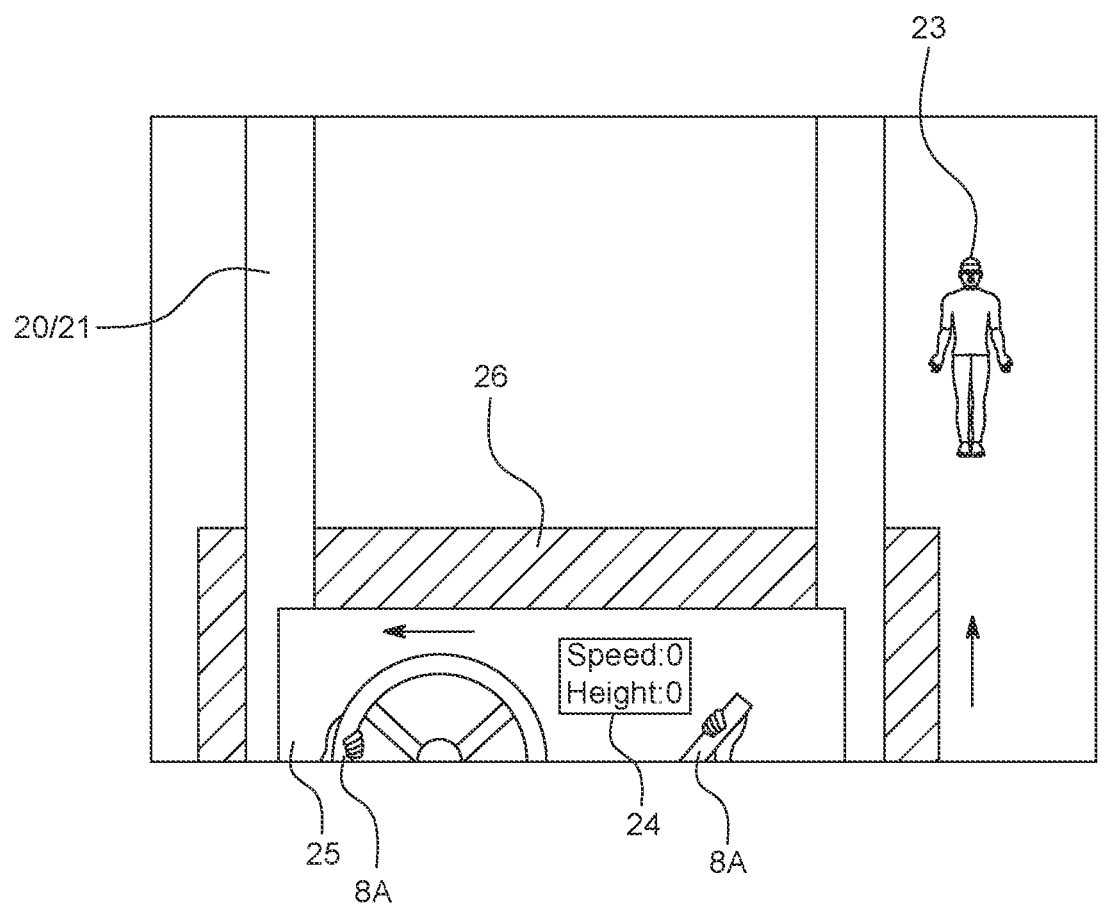
FIG. 6A is a second sample view inside the virtual reality simulator environment showing the simulated operation of a forklift in accordance with the embodiment of FIG. 3.
Figure 6B:
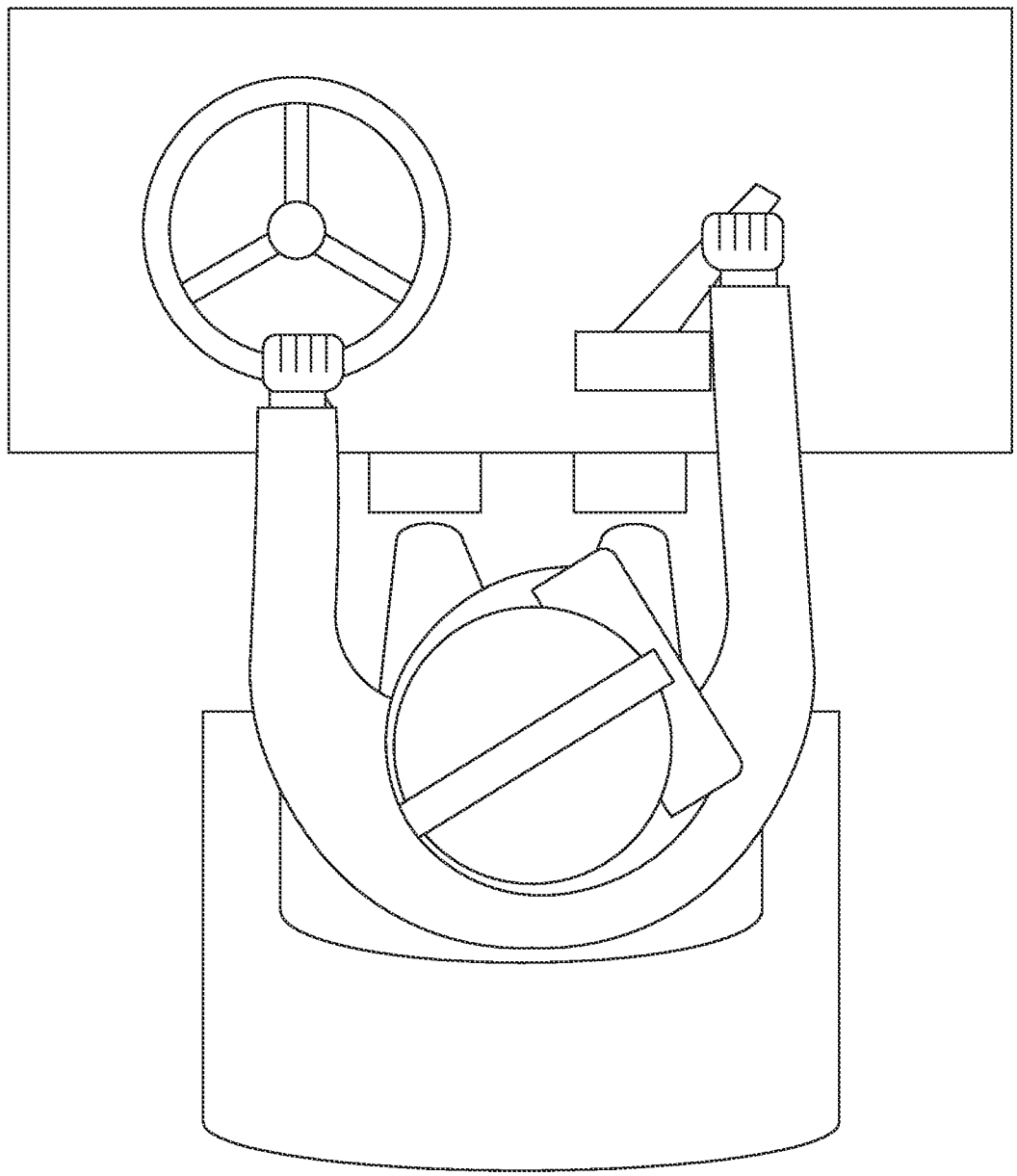
FIG. 6B is a top view of the embodiment of the system showing the positioning of the actual limbs of the trainee operator in relation to the nonvirtual controls, shown in rendered form in FIG. 6A.

FIGS. 6A and 6B are a similar pair of representations to that of FIGS. 5A and 5B—showing a modified view inside the VR environment, based upon different orientation of the controls and the limbs of the trainee operator shown in FIG. 6B. As can be seen from FIG. 6B, in this case the control settings are different and the operator is looking to the right. Different settings appear in the rendered version of the cab of the forklift based upon the different control settings of the nonvirtual controls 8 within the training cab 7, shown in FIG. 6B. Also, in this case, a load 26 is shown being lifted by the forklift 20, and both because of the movement of the direction of the view of the trainee operator as well as because of the steering direction of the forklift to the left, movement of the obstacle, being a person, 23 out of the direction of travel of the forklift 20 is also shown. These figures are shown simply to in a very basic sense demonstrate the idea of the generation of a virtual reality view in a training simulator for a piece of equipment in accordance with the invention, where the dashboard settings of the virtual equipment and its behaviour are emulated from settings of the nonvirtual controls 8 in the control cab 7. Obviously, many different types of specific views could be created, in varying levels of detail and the like. All are contemplated within the scope of the present invention.

Operating sessions in accordance with the method of the present invention could also be recorded by the computer i.e. the rendering software component 4 could store the necessary information to play back the operating session on the human display interface 3 or on a remote screen either during or after the completion of the training session. The rendering software component 4 could also be programmed to grate the performance of the training operator etc. —many different types of simulator-based training grading, approvals and the like will be understood to those skilled in the art.

It is specifically contemplated that the software of the present invention could be a rendering software component 4 capable of loading a particular operational model for a particular type of equipment to be operated within the virtual environment, whereby the rendering software component 4 and the related hardware could be used for the training of operators of multiple types of equipment by simply loading a different operational module or environment into the memory of the computer 2 for operation in conjunction with the remainder of the instructions of the rendering software component 4. A different operational module or environment could be loaded for the same type of a virtual equipment copy, to simply provide different training circumstances of a different level of complexity etc., or in other cases the operational module or environment loaded for use in conjunction with the rendering software component 4 could relate to the operation of a completely different virtual piece of equipment, with a different set of nonvirtual controls 8 and control cab 7 being connected to the computer 2 for this purpose. All such approaches are contemplated within the scope of the present invention.

The rendering software component 4, or related software components loaded within the memory of the computer 2, will facilitate the ongoing operation of an image recognition function to be applied to the video signal data stream captured from the camera 11 to the computer 2. Various types of image recognition functions will be understood to those skilled in the art of image recognition algorithms and programming and all are contemplated within the scope of the present invention. Basically, the image recognition function will be responsible for identifying the positioning and orientation of the limbs of the trainee operator within the control cab 7 and in relation to the nonvirtual controls 8, so that the remainder of the VR rendering functionality of the rendering software component 4 can be used to create realistic virtual copies of at least portions of the limbs of the trainee operator in relation to the rendered cab controls inside of the virtual training cab.

Also, as outlined, the image recognition function might be capable of recognizing the positioning of the trainee position 10 within the training cab. Certain embodiments of the rendering software component 4 could use the identification of the positioning of the trainee position 10 within the training cab as an additional variable or data point in the most accurate rendering of the virtual equipment.

Recognition of elements within an image captured from a camera, including the limbs of an operator, will be understood to be a programmable attribute of an image recognition function and any type of an approach yielding this result is contemplated to be within the scope of the present invention. By recognizing the positioning and orientation of at least portions of the limbs of the trainee operator in relation to the nonvirtual controls, so that virtual copies of the limbs of the trainee operator can be rendered within the virtual environment in relation to the rendered cab controls, the trainee operator can see their limbs in relation to the controls inside of the virtual environment, while feeling the actual nonvirtual controls 8 in communication with their limbs in the physical control cab.

The specific instructions to be included within the rendering software component 4 to allow for the rendering of the virtual reality environment for display to the trainee operator inside the human interface device 3 will be understood to those skilled in the art of virtual reality rendering design and programming. Any type of programming approach or software methodology which achieves the necessary data receipt, manipulation, calculation and display functions required within the method of the present invention is contemplated within the scope hereof.

Changes in the limb rendering data, operating values of the nonvirtual controls 8, or any other ongoing entity behaviour calculations or adjustments as programmed in the rendering software component 4 with respect to the typical operating behaviour of the equipment and other entities within the VR environment [i.e. for example, if the virtual version of the equipment being operated was a motive device and movement of the device in a particular direction had been initiated by the trainee operator using the nonvirtual controls 8, the system would track the ongoing positioning, speed and orientation of the virtual version of the equipment and continuous movement until control changes were made etc.] would all result in changes to the display shown to the trainee operator. The rendering of a useful VR environment for training purposes, showing the operation of a virtual version of equipment within a virtual environment including even for example other moving devices or entities which need to be avoided, steered around etc. will all be understood to those skilled in the art of the design of virtual reality programming of this nature and are all contemplated within the scope of the invention. The key aspect of the invention is that the trainee operator would see at least portions of their limbs interacting with the rendered cab controls inside of the virtual environment as their actual limbs interacted with the nonvirtual controls 8 within the training control cab 7.

Adjustment of the Trainee Position:

In certain embodiments of the system of the present invention, the trainee position 10 could be physically adjustable within the training control cab 7 to allow for movement of the trainee position 10—for example an adjustable seat where a simulated operator seat was included in the training control cab 7 could allow for the adjustment of movement by the trading operator of the trainee position 10 in relation to the nonvirtual controls 8. In other cases where the trainee position 10 was a standing position in relation to the nonvirtual controls 8, trainee position 10 could be moved simply by the trainee operator standing closer or further away from the nonvirtual controls. In any case, allowing for the adjustment of the trainee position 10 would maximize the comfort and again the simulated reality of the training control cab 7 and hopefully further enhance the reality of the VR environment and experience to maximize the training impact on the trainee operator.

Where the trainee position 10 is adjustable, the system might permit for the selection of a particular trainee position 10 location in the settings of the rendering software component 4—if the rendering software component 4 knows where the trainee position 10 is located it can make the necessary rendering adjustments in the VR environment to provide the maximum reality to its operation. This might be permitted by allowing for a manual position selection by the trainee operator or a user in configuration of the rendering software component 4 in advance of operation, or in other cases rather than using a manually selected position setting, the positioning of the trainee position 10 in relation to the nonvirtual controls 8 could be automatically captured as a control input by the control bus 6. Both such approaches are contemplated within the scope of the present invention. The training position 10 might even be identified by the image recognition function applied to the video signal data stream captured from the camera.

In cases where the trainee position 10 is movable in relation to the remainder of the training control cab 7, the rendering software component could be programmed to adapt the rendered versions of the at least portions of the limbs of the trainee operator of the rendered cab controls Force Feedback:

To further enhance the reality of the simulation in the VR environment and enhance the training reinforcement received by the trainee operator, one or more of the virtual controls 8 in the training control cab 7 might include a force feedback mechanism to provide enhanced tactile feedback to the training operator during operation of the method. The trainee operator would obviously receive tactile feedback to their lands in terms of manipulating and actuating the nonvirtual controls 8, but it may be the case that force feedback could be provided to further enhance the reality of the simulated operating environment by, for example, allowing for the application of force feedback on the steering wheel as a nonvirtual control 8 etc.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A method of integrating nonvirtual controls in a virtual reality (VR) training simulator for training a trainee operator in the operation of equipment, said equipment having a physical control cab with a plurality of operator-actuated controls for use in operation thereof positioned in relation to an operator position, said method accomplished using a system comprising:
 a computer comprising:
  a processor and memory;
  a human display interface connected to the computer for display to the trainee operator of a three-dimensional VR operating environment;
 a training simulator software component programmed to render and display the VR operating environment in accordance with the remainder of the method;
 a control bus for capture of control inputs by the computer for use in the rendering of the VR operating environment; and
 a training control cab, comprising:
  a plurality of nonvirtual controls corresponding to and emulating a plurality of the operator-actuated controls of the physical control cab of the equipment, said nonvirtual controls being positioned in relation to a trainee position corresponding approximately to the location of the operator position in the physical control cab and from which the trainee operator can interact with said nonvirtual controls, each nonvirtual control being equipped with sensors to permit capture of operating values therefrom upon manual actuation of same and being operatively connected to the control bus of the computer, whereby the operating values from the nonvirtual controls are captured via the control bus for use by the training simulator software component;
  a video camera connected to the computer and positioned to capture a view of the trainee operator in the trainee position and the positioning and orientation of limbs of the trainee operator in relation to the nonvirtual controls, and generate a video signal data stream corresponding thereto which is captured via the control bus for use by the training simulator software component;
 said method comprising, using the training simulator software component:
  on initiation of the method and throughout the time of training operation by the trainee operator, rendering and updating the view of the VR operating environment to a human display device within which the trainee operator can simulate the operation of a virtual version of the equipment, said view seen from the perspective of the trainee operator of the equipment in the trainee position in the physical control cab and including:
   placement, behavior and operation of the virtual version of the equipment in relation to an operating area;
   a virtual control cab of the equipment including rendered versions of at least each operator-actuated control, being rendered cab controls, showing current status of the rendered cab controls based on the corresponding nonvirtual controls in the training control cab; and
   simulated view of at least portions of the limbs of the trainee operator in relation to their position in the training control cab of the equipment and in interaction with the rendered cab controls, based upon the limb positioning of the trainee operator in relation to the nonvirtual controls in the training control cab;
  when the trainee operator manually actuates any of the nonvirtual controls in the training control cab:
   translating operating values corresponding to said manual actuation received via the control bus into updated control parameters to be applied to the behaviour of the virtual version of the equipment within the VR operating environment; and
   applying any updated control parameters to the rendering and behaviour of the virtual version of the equipment and the corresponding rendered cab controls within the virtual control cab;

on an ongoing basis during operation of the virtual version of the equipment by the trainee operator:
applying an image recognition function to the video signal data stream to yield the necessary limb rendering data corresponding to the positioning and orientation of the limbs of the trainee operator in relation to the nonvirtual controls within the training control cab, to permit the rendering of virtual versions of portions of the limbs of the trainee operator within the VR operating environment; and
upon any movement of the limbs of the trainee operator resulting in modified limb rendering data, applying any updated limb rendering data to the rendering and behavior of the simulated versions of the portions of the limbs of the trainee operator within the VR operating environment;

wherein during operation of the virtual version of the equipment within the VR operating environment, the trainee operator will be able to see a rendered version of at least portions of their limbs interacting with controls in the virtual control cab while physically feeling the actuation of the nonvirtual controls within the training control cab.

2. The method of claim 1 wherein the rendering software component will adjust the appearance of the simulated view of the portions of the limbs of the trainee operator within the VR operating environment in relation to the rendered cab controls based upon the spacing of the trainee position in the training control cab from the nonvirtual controls.

3. The method of claim 2 wherein the positioning of the trainee position within the training control cab is physically adjustable.

4. The method of claim 3 wherein the rendering software component will adapt the rendered versions of the portions of the limbs of the trainee operator and the rendered cab controls on the basis of a manually selected position setting, selected by the trainee operator in advance of operation of the simulation.

5. The method of claim 3 wherein the training control cab is instrumented such that the positioning of the trainee position in relation to the nonvirtual controls can be automatically captured as a control input by the control bus.

6. The method of claim 5 wherein the trainee position comprises a seat positioned in relation to the remainder of the training control cab.

7. The method of claim 3 wherein location of the trainee position within the training control cab is identified by the image recognition function applied to the video signal data stream captured from the video camera.

8. The method of claim 1 wherein the equipment is operated from a standing operator position in the physical control cab.

9. The method of claim 1 wherein the equipment is operated from a seated operator position in the physical control cab.

10. The method of claim 9 wherein the trainee position comprises a seat positioned in relation to the remainder of the training control cab.

11. The method of claim 1 wherein one or more of the nonvirtual controls includes a force feedback mechanism to provide tactile feedback to the trainee operator during operation of the method.

12. The method of claim 1 wherein the equipment being operated in the VR training environment includes locomotion functions, and the nonvirtual controls in the training control cab include locomotion controls to simulate locomotion control thereof.

13. The method of claim 1 wherein the equipment being operated in the VR training environment includes non-locomotion equipment functions, and the nonvirtual controls in the training control cab include process controls to simulate the operation of said non-locomotion equipment functions.

14. The method of claim 1 wherein the control bus comprises an external hardware device removeably connected to the computer.

15. The method of claim 1 wherein the human display device comprises a helmet-type display physically worn by the trainee operator.

16. A training simulator software component for use on a computer in association with a system for integrating nonvirtual tactile controls in a virtual reality (VR) training simulator for training a trainee operator in the operation of equipment, said equipment having a physical control cab with a plurality of operator-actuated controls for use in operation thereof positioned in relation to an operator position, said system comprising:
a computer for hosting and execution of the training simulator software component comprising:
a processor and memory;
a human display interface connected thereto for the display to a trainee operator of a three-dimensional VR operating environment within which the trainee operator can operate a virtual version of the equipment; and
a control bus for the capture of control inputs and video signal stream data by the computer for use in the rendering of the VR operating environment;
a training control cab for use by the trainee operator comprising:
a plurality of nonvirtual controls corresponding to and emulating a plurality of the operator-actuated controls of the physical control cab of the equipment, said nonvirtual controls being positioned in relation to a trainee position corresponding approximately to the location of the operator position in the physical control cab and from which the trainee operator can interact with said nonvirtual controls, each nonvirtual control being equipped with sensors to permit capture of operating values therefrom upon manual actuation of same and being operatively connected to the control bus of the computer, whereby the operating values from the nonvirtual controls are captured via the control bus for use by the training simulator software component; and
a video camera connected to the computer and positioned to capture a view of the trainee operator in the trainee position and the positioning and orientation of limbs of the trainee operator in relation to the nonvirtual controls, and generate a video signal data stream corresponding thereto which is captured via the control bus for use by the training simulator software component;
said software capable of facilitating the method of integrating nonvirtual controls in a VR training simulator when executed by the computer by, in conjunction with hardware components of the computer:
on initiation of the method and throughout the time of training operation by the trainee operator, rendering and updating the view of the VR operating environment to the human display interface, said view seen from the perspective of the trainee operator of the equipment in the trainee position in the physical control cab and including:
placement, behavior and operation of the virtual version of the equipment in relation to an operating area;
a virtual control cab of the equipment including rendered versions of at least each operator-actuated control, being rendered cab controls, showing current status of the rendered cab controls based on the corresponding nonvirtual controls in the training control cab; and
simulated view of portions of the limbs of the trainee operator in relation to their position in the training control cab of the equipment and in interaction with each of the rendered cab controls, based upon the limb positioning of the trainee operator in relation to the nonvirtual controls in the training control cab;
when the trainee operator manually actuates any of the nonvirtual controls in the training control cab:
translating operating values corresponding to said manual actuation received via the control bus into updated control parameters to be applied to the behaviour of the virtual version of the equipment within the VR operating environment; and
applying any updated control parameters to the rendering and behaviour of the virtual version of the equipment and the corresponding rendered cab controls within the virtual control cab;
on an ongoing basis during operation of the virtual version of the equipment by the trainee operator:
applying an image recognition function to the video signal data stream to yield the necessary limb rendering data corresponding to the positioning and orientation of the portions of the limbs of the trainee operator in relation to the nonvirtual controls within the training control cab, to permit the rendering of virtual versions of the portions of the limbs of the trainee operator within the VR operating environment; and
upon any movement of the limbs of the trainee operator resulting in modified limb rendering data, applying any updated limb rendering data to the rendering and behavior of the simulated versions of the portions of the limbs of the trainee operator within the VR operating environment;
wherein during operation of the virtual version of the equipment within the VR operating environment, the trainee operator will be able to see a rendered version of at least portions of their limbs interacting with controls in the virtual control cab while physically feeling the actuation of the nonvirtual controls within the training control cab.

17. The training simulator software component of claim 16 wherein the rendering software component will adjust the appearance of the simulated view of the portions of the limbs of the trainee operator within the VR operating environment in relation to the rendered cab controls based upon the spacing of the trainee position in the training control cab from the nonvirtual controls.

18. The training simulator software component of claim 17 wherein the positioning of the trainee position within the training control cab is physically adjustable.

19. The training simulator software component of claim 18 wherein the rendering software component will adapt the rendered versions of the portions of the limbs of the trainee operator and the rendered cab controls on the basis of a manually selected location setting indicating the trainee position, selected by the trainee operator in advance of operation of the simulation.

20. The training simulator software component of claim 18 wherein the training control cab is instrumented such that the positioning of the trainee position in relation to the nonvirtual controls can be automatically captured by the control bus.

21. The training simulator software component of claim 18 wherein location of the trainee position within the training control cab is identified by the image recognition function applied to the video signal data stream captured from the video camera.

22. The training simulator software component of claim 16 wherein one or more of the nonvirtual controls includes a force feedback mechanism to provide tactile feedback to the trainee operator during operation of the method.

23. The training simulator software component of claim 22 wherein at least one of the nonvirtual controls including the force feedback mechanism is actuated to provide force feedback to the trainee operator by the software component and the computer as determined to be required in the simulation.

24. An equipment operation simulation system integrating nonvirtual controls in a virtual reality (VR) training environment for training the trainee operator in the operation of equipment, said equipment having a physical control cab with a plurality of operator-actuated controls for use in operation thereof positioned in relation to an operator position, said system comprising:
a computer comprising:
a processor and memory;
a human display interface connected to the computer for display to a trainee operator of a three-dimensional VR operating environment;
a training simulator software component programmed to render and display the VR operating environment in accordance with the remainder of the method;
a control bus for capture of control inputs and video signal stream data by the computer for use in the rendering of the VR operating environment; and
a training control cab, comprising:
a plurality of nonvirtual controls corresponding to and emulating a plurality of the operator-actuated controls of the physical control cab of the equipment, said nonvirtual controls being positioned in relation to a trainee position corresponding approximately to the location of the operator position in the physical control cab and from which the trainee operator can interact with said nonvirtual controls, each nonvirtual control being equipped with sensors to permit capture of operating values therefrom upon manual actuation of same and being operatively connected to the control bus of the computer, whereby the operating values from the nonvirtual controls are captured via the control bus for use by the training simulator software component;
a video camera connected to the computer and positioned to capture a view of the trainee operator in the trainee position and the positioning and orientation of limbs of the trainee operator in relation to the nonvirtual controls, and generate a video signal data stream corresponding thereto which is captured via the control bus for use by the training simulator software component;

where in operation of the system the training simulator software component and computer will:

on initiation of the method and throughout the time of training operation by the trainee operator, render and update the view of the VR operating environment to the human display interface within which the trainee operator can simulate the operation of a virtual version of the equipment, said view seen from the perspective of the trainee operator of the equipment in the trainee position in the physical control cab and including:
- placement, behavior and operation of the virtual version of the equipment in relation to an operating area;
- a virtual control cab of the equipment including rendered versions of at least each operator-actuated control, being rendered cab controls, showing current status of the rendered cab controls based on the corresponding nonvirtual controls in the training control cab; and
- simulated view of portions of the limbs of the trainee operator in relation to their position in the training control cab of the equipment and in interaction with each of the rendered cab controls, based upon the limb positioning of the trainee operator in relation to the nonvirtual controls in the training control cab;

when the trainee operator manually actuates any of the nonvirtual controls in the training control cab:
- translate operating values corresponding to said manual actuation received via the control bus into updated control parameters to be applied to the behaviour of the virtual version of the equipment within the VR operating environment; and
- apply any updated control parameters to the rendering and behaviour of the virtual version of the equipment and the corresponding rendered cab controls within the virtual control cab;

on an ongoing basis during operation of the virtual version of the equipment by the trainee operator:
- apply an image recognition function to the video signal data stream to yield the necessary limb rendering data corresponding to the positioning and orientation of the limbs of the trainee operator in relation to the nonvirtual controls within the training control cab, to permit the rendering of virtual versions of the portions of the limbs of the trainee operator within the VR operating environment; and
- upon any movement of the limbs of the trainee operator resulting in modified limb rendering data, apply any updated limb rendering data to the rendering and behavior of the simulated versions of the portions of the limbs of the trainee operator within the VR operating environment;

wherein during operation of the virtual version of the equipment within the VR operating environment, the trainee operator will be able to see a rendered version of at least portions of their limbs interacting with controls in the virtual control cab while physically feeling the actuation of the nonvirtual controls within the training control cab.

25. The system of claim 24 wherein the rendering software component will adjust the appearance of the simulated view of the portions of the limbs of the trainee operator within the VR operating environment in relation to the rendered cab controls based upon the spacing of the trainee position in the training control cab from the nonvirtual controls.

26. The system of claim 25 wherein the positioning of the trainee position within the training control cab is physically adjustable.

27. The system of claim 26 wherein the rendering software component will adapt the rendered versions of the portions of the limbs of the trainee operator and the rendered cab controls on the basis of a manually selected position setting, selected by the trainee operator in advance of operation of the simulation.

28. The system of claim 26 wherein the training control cab is instrumented such that the positioning of the trainee position in relation to the nonvirtual controls can be automatically captured as a control input by the control bus.

29. The system of claim 28 wherein the trainee position comprises a seat positioned in relation to the remainder of the training control cab.

30. The system of claim 26 wherein location of the trainee position within the training control cab is identified by the image recognition function applied to the video signal data stream captured from the video camera.

31. The system of claim 24 wherein one or more of the nonvirtual controls includes a force feedback mechanism to provide tactile feedback to the trainee operator during operation of the method.

32. The system of claim 24 wherein the control bus comprises an external hardware device removeably connected to the computer.

33. The system of claim 24 wherein the human display interface comprises a helmet-type display physically worn by the trainee operator.

* * * * *